United States Patent
Starostin et al.

(10) Patent No.: US 10,210,249 B2
(45) Date of Patent: Feb. 19, 2019

(54) METHOD AND SYSTEM OF TEXT SYNTHESIS BASED ON EXTRACTED INFORMATION IN THE FORM OF AN RDF GRAPH MAKING USE OF TEMPLATES

(71) Applicant: ABBYY InfoPoisk LLC, Moscow (RU)

(72) Inventors: Anatoly Starostin, Moscow (RU); Dmitrii Kuklin, Yoshkar-Ola (RU)

(73) Assignee: ABBYY PRODUCTION LLC, Moscow (RU)

( * ) Notice: Subject to any disclaimer, the term of this patent is extended or adjusted under 35 U.S.C. 154(b) by 69 days.

(21) Appl. No.: 14/717,320

(22) Filed: May 20, 2015

(65) Prior Publication Data
US 2016/0275058 A1 Sep. 22, 2016

(30) Foreign Application Priority Data

Mar. 19, 2015 (RU) .................................. 2015109665

(51) Int. Cl.
*G06F 17/27* (2006.01)
*G06F 17/30* (2006.01)
(52) U.S. Cl.
CPC .... *G06F 17/30734* (2013.01); *G06F 17/2785* (2013.01); *G06F 17/30616* (2013.01)
(58) Field of Classification Search
CPC ........... G06F 17/2785; G06F 17/30734; G06F 17/30625
USPC ............................................................ 704/9
See application file for complete search history.

(56) References Cited

U.S. PATENT DOCUMENTS

| | | |
|---|---|---|
| 6,085,187 A | 7/2000 | Carter et al. |
| 7,493,333 B2 | 2/2009 | Hill et al. |
| 7,496,593 B2 | 2/2009 | Gardner et al. |
| 7,505,989 B2 | 3/2009 | Gardner et al. |
| 7,668,791 B2 | 2/2010 | Azzam et al. |
| 7,739,218 B2 | 6/2010 | Argüello et al. |
| 7,912,699 B1 * | 3/2011 | Saraclar ................ G10L 15/142 704/9 |
| 7,912,849 B2 | 3/2011 | Øhrn et al. |
| 7,949,676 B2 | 5/2011 | Mori et al. |

(Continued)

FOREIGN PATENT DOCUMENTS

KR 100941155 B1 1/2009

OTHER PUBLICATIONS

D'Acierno et al., "Semantic Summarization of Web Documents", 2010 IEEE Fourth International Conference on Semantic Computing (ICSC), 2010, 6 pages, Carnegie Mellon University, Pittsburgh, PA, USA.

(Continued)

*Primary Examiner* — Bharatkumar S Shah
(74) *Attorney, Agent, or Firm* — Lowenstein Sandler LLP

(57) ABSTRACT

Disclosed are system, method and computer program product for synthesis of natural-language text; receiving information objects; selecting among the received information objects information objects and an associated synthesis templates in a template library, each synthesis template including a template semantic-syntactic tree; generating for each selected information object a synthesis semantic-syntactic tree based on the template semantic-syntactic tree; and generating natural language text based on each generated synthesis semantic-syntactic tree.

20 Claims, 15 Drawing Sheets

(56) References Cited

U.S. PATENT DOCUMENTS

| | | |
|---|---|---|
| 7,991,760 B2 | 8/2011 | Kolz et al. |
| 8,014,997 B2 | 9/2011 | Huang et al. |
| 8,041,702 B2 | 10/2011 | Eggebraaten et al. |
| 8,065,655 B1 | 11/2011 | Deo et al. |
| 8,069,185 B2 | 11/2011 | Martin et al. |
| 8,140,535 B2 | 3/2012 | Eggebraaten et al. |
| 8,140,557 B2 | 3/2012 | Dettinger et al. |
| 8,145,579 B2 | 3/2012 | Iqbal et al. |
| 8,209,295 B2 | 6/2012 | Faraotti et al. |
| 8,225,380 B2 | 7/2012 | Moshir et al. |
| D665,414 S | 8/2012 | Lee et al. |
| 8,239,342 B2 | 8/2012 | Ross et al. |
| 8,250,101 B2 | 8/2012 | Fot et al. |
| 8,266,184 B2 | 9/2012 | Liu et al. |
| 8,276,061 B2 | 9/2012 | Joshi et al. |
| 8,285,711 B2 | 10/2012 | Bordawekar et al. |
| 8,316,006 B2 | 11/2012 | Cain et al. |
| 8,335,753 B2 | 12/2012 | Rappaport et al. |
| 8,335,754 B2 | 12/2012 | Dawson et al. |
| 8,336,024 B2 | 12/2012 | Kannan et al. |
| 8,484,141 B2 | 7/2013 | Grabarnik et al. |
| 8,566,363 B2 | 10/2013 | Fang et al. |
| 9,135,231 B1* | 9/2015 | Barra .................. G06F 17/24 |
| 2004/0122656 A1 | 6/2004 | Abir |
| 2005/0065773 A1 | 3/2005 | Huang et al. |
| 2005/0154690 A1 | 7/2005 | Nitta et al. |
| 2006/0100856 A1 | 5/2006 | Kang et al. |
| 2008/0091405 A1* | 4/2008 | Anisimovich ...... G06F 17/2755 704/4 |
| 2009/0055381 A1 | 2/2009 | Wu et al. |
| 2009/0091405 A1 | 4/2009 | Cho et al. |
| 2009/0157401 A1 | 6/2009 | Bennett et al. |
| 2010/0161317 A1 | 6/2010 | Au et al. |
| 2010/0318558 A1* | 12/2010 | Boothroyd ........ G06F 17/30731 707/769 |
| 2011/0077936 A1 | 3/2011 | Arumugam et al. |
| 2011/0270607 A1 | 11/2011 | Zuev et al. |
| 2012/0047131 A1* | 2/2012 | Billawala .......... G06F 17/30696 707/723 |
| 2012/0109640 A1 | 5/2012 | Anisimovich et al. |
| 2012/0310926 A1 | 12/2012 | Gannu et al. |
| 2013/0066921 A1 | 3/2013 | Mark et al. |
| 2014/0114649 A1 | 4/2014 | Zuev et al. |
| 2015/0142704 A1* | 5/2015 | London .................... G06N 5/04 706/11 |
| 2016/0336007 A1* | 11/2016 | Hanazawa ........ G06F 17/30681 |
| 2017/0098442 A1* | 4/2017 | Hoffmeister ............ G10L 15/02 |

OTHER PUBLICATIONS

D'Acierno et al., "iWIN: a Summarizer System Based on a Semantic Analysis of Web Documents", 2012, 8 pages, 2012 IEEE Sixth International Conference on Semantic Computing, Palermo, Italy.

Korabu et al., "Semantic Summarization of Web Documents", Proceedings of the 14th ACM international conference on Information and knowledge Management, 2005, 4 pages, Bremen, Germany.

* cited by examiner

METHOD AND SYSTEM OF TEXT SYNTHESIS BASED ON EXTRACTED INFORMATION IN THE FORM OF AN RDF GRAPH MAKING USE OF TEMPLATES

CROSS REFERENCE TO RELATED APPLICATIONS

This application claims the benefit of priority to Russian patent application No. 2015109665, filed Mar. 19, 2015; disclosure of which is hereby incorporated by reference in its entirety.

FIELD OF TECHNOLOGY

The present disclosure pertains to devices, systems, methods and computer programs in the field of automatic processing of text data in natural languages (Natural Language Processing).

BACKGROUND

One of the major problems at present in the field of automatic processing of text information presented in natural languages is the synthesis of text based on information objects extracted from text data. One of the applied problems of text synthesis based on extracted information is automatic text annotation.

Automatic annotation is a text data processing routine for subsequent extraction of basis information from the data and its further processing. At present, the existing methods for automatic annotation may be divided into two types. The distinguishing feature of the first type of annotation is the fact that the annotation text consists of sentences of the source text, being the so-called method of "extraction-based summarization". The methods of the second type of annotation, "abstraction-based summarization", present an annotation text which is synthesized on the basis of the content of the source text. Given the technical complexity in the realization of automatic text synthesis and extraction of information therefrom, the main methods of annotation are methods of the "extraction-based summarization" type. Examples of automatic annotation of the "extraction-based summarization" type are the methods: TextRank, the method of annotation based on terminology and semantics, and the method of annotation based on latent semantic analysis.

The TextRank annotation method is an extremely simple algorithm for automatic annotation which presents the source text in the form of a graph whose nodes are sentences, while its graph edges are the "relation" between two sentences. The relation is defined by the number of identical words in the given sentences. Each edge in the graph has a weight, while each vertex is assigned a rating, computed on the basis of two criteria:

The number of edges emerging from other vertices,
The rating of these edges.

The nodes with the highest rating contain sentences which will be used in the annotation text. The chief defect of this method of annotation is that fact that it makes practically no allowance for the text semantics, and therefore the annotation is not always true and accurate.

The annotation algorithm based on terminology and semantics ranks the sentences of the source text by using metrics based on terms extracted from the text. With the aid of an ontology, a correlation is established between each term from the text and the terms from the heading, and on this basis the weight of each term is computed. The weight of a sentence is computed as the sum of the weights of all the terms used therein.

The method based on latent semantic analysis is also based on a ranking of sentences with the aid of terms. The foundation of the method is the principle of selection of sentences having maximum importance in terms of a particular topic. However, this method as well has drawbacks. Since the sentences are selected by the principle that the importance of the sentence is a maximum in at least one topic, this means that a sentence whose importance is good in all topics, but not a maximum in any of them, will not make it into the annotation. Besides this, topics of slight importance are not filtered out, so that the size of the annotation may be larger than is needed.

The specification discloses a method of automatic annotation of text data of the "abstraction-based summarization" type, which remedies the deficiencies of the existing methods and enables a text synthesis with high accuracy based on extracted data—information objects—from the text.

SUMMARY

Disclosed are systems, methods, and computer programs for synthesis of natural-language text.

In one aspect, an example method of synthesis of natural-language text comprises: receiving by a hardware processor a plurality of received information objects; selecting by the hardware processor among the plurality of received information objects at least one selected information object and, for each selected information object, an associated synthesis template in a template library, wherein the library includes at least one synthesis template, and wherein each synthesis template includes a template semantic-syntactic tree generating by the hardware processor for each selected information object a synthesis semantic-syntactic tree based on the template semantic-syntactic tree of the associated synthesis template selected for the selected information object; and generating by the hardware processor natural language text based on each generated synthesis semantic-syntactic tree.

In another aspect, an example system for synthesis of natural-language text comprises an information object receiving module configured to receive a plurality of received information objects; an information object selection module configured to select among the plurality of received information objects at least one selected information object and, for each selected information object, an associated synthesis template in a template library, wherein the library includes at least one synthesis template, and wherein each synthesis template includes a template semantic-syntactic tree a synthesis semantic-syntactic tree generation module configured to generate for each selected information object a synthesis semantic-syntactic tree based on the template semantic-syntactic tree of the associated synthesis template selected for the selected information object; and a natural text generation module configured to generate natural language text based on each generated synthesis semantic-syntactic tree.

In yet another aspect, an example computer program product stored on a non-transitory computer-readable storage medium, the computer program product comprising computer-executable instructions for synthesis of natural-language text, comprising instructions for: receiving by a hardware processor a plurality of received information objects; selecting by the hardware processor among the plurality of received information objects at least one selected information object and, for each selected information object, an associated synthesis template in a template library, wherein the library includes at least one synthesis template, and wherein each synthesis template includes a template semantic-syntactic tree generating by the hardware processor for each selected information object a synthesis semantic-syntactic tree based on the template semantic-syntactic tree of the associated synthesis template selected for the selected information object; and generating by the hardware processor natural language text based on each generated synthesis semantic-syntactic tree.

In some aspects, each received information object is associated with an ontological object and has a set of filled properties, each filled property having a value; each synthesis template is associated with an ontological object, each synthesis template includes a set of required properties; each synthesis template includes a set of optional properties; each synthesis template includes a validation script; the selecting of at least one selected information object and an associated synthesis template comprises, for each received information object, selecting in the template library synthesis templates associated with the same ontological object as the received information object; then, if any synthesis template is selected, selecting among the selected synthesis templates synthesis templates for each of which a set of required properties is contained in the set of filled properties of the received information object; then, if any synthesis template is selected, selecting among the selected synthesis templates synthesis templates with the largest set of required properties; then, if any synthesis template is selected, selecting among the selected synthesis templates synthesis templates for each of which the validation script validates the received information object; then, if any synthesis template is selected, selecting among the selected synthesis templates synthesis templates with the largest intersection of the set of optional properties with the set of filled properties of the received information object; and then, if any synthesis template is selected, selecting the received information object and associating one of the selected synthesis templates with the selected information object. In some aspects, each selected information object has a set of filled properties, each filled property having a natural-language string value; each template semantic-syntactic tree comprises template nodes; each synthesis template comprises for each of at least some of the template nodes forming a substitution set of nodes a corresponding filled property; generating for each selected information object a synthesis semantic-syntactic tree comprises, for each template node of the associated synthesis template, beginning with a root node of the template semantic-syntactic tree: if the template node is not in the substitution set of nodes, generating in the synthesis semantic-syntactic tree an identical node; if the template node is in the substitution set of nodes and if the property corresponding to the template node is a filled property of the selected information object, generating in the synthesis semantic-syntactic tree a node or a sub-tree based on analysis of the natural-language string value of the filled property of the selected information object corresponding to the template node; and repeating the prior two steps for each child node of the template semantic-syntactic tree. In some aspects, generating for each selected information object a synthesis semantic-syntactic tree further comprises, if the template node is in the substitution set of nodes, if the property corresponding to the template node is a filled property of the selected information object, and if the filled property of the selected information object has more than one natural-language string value, for each natural-language string value, generating in the synthesis semantic-syntactic tree a node or a sub-tree based on the natural-language string value corresponding to the template node; and connecting the generated nodes with a coordinating link. In some aspects, the plurality of received information objects forms an RDF graph. Some aspects further comprise: forming at least one group of selected information objects associated with the same synthesis template; and generating for the at least one group a synthesis semantic-syntactic tree based on the template semantic-syntactic tree of the associated synthesis template.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

DETAILED DESCRIPTION

Example aspects are described herein in the context of a system, method and computer program product for text synthesis based on extracted information in the form of an RDF graph making use of templates. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present specification presents a method and a system enabling a text synthesis on the basis of an RDF graph making use of templates. The proposed text synthesis method is able to create annotations which include brief information on the most important facts mentioned in the text. However, the text synthesis based on an RDF graph using templates is not limited to applications in the field of annotation.

Figure 1:
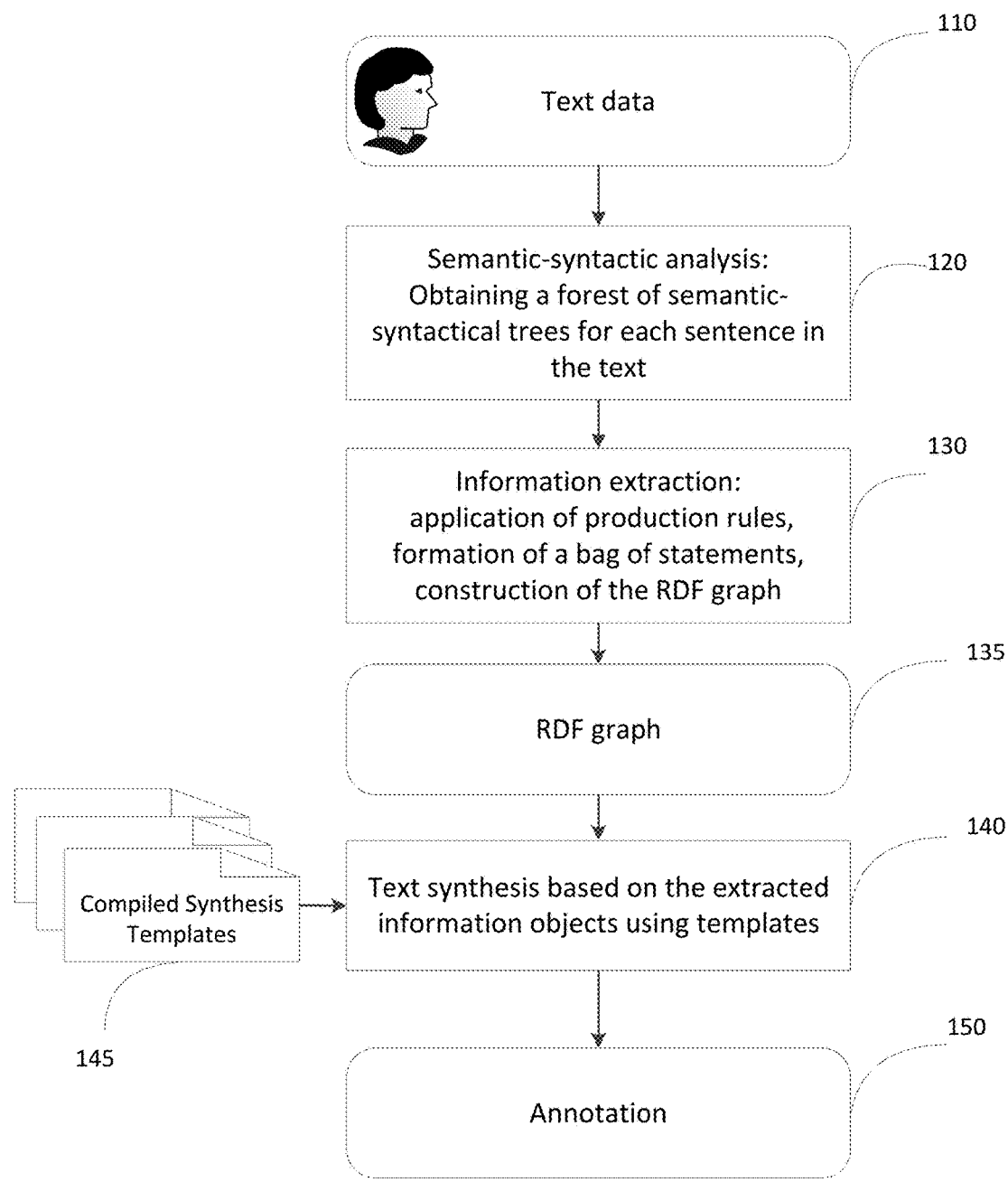
FIG. 1 illustrates the sequence of steps in accordance with an example aspect.
Figure 1A:
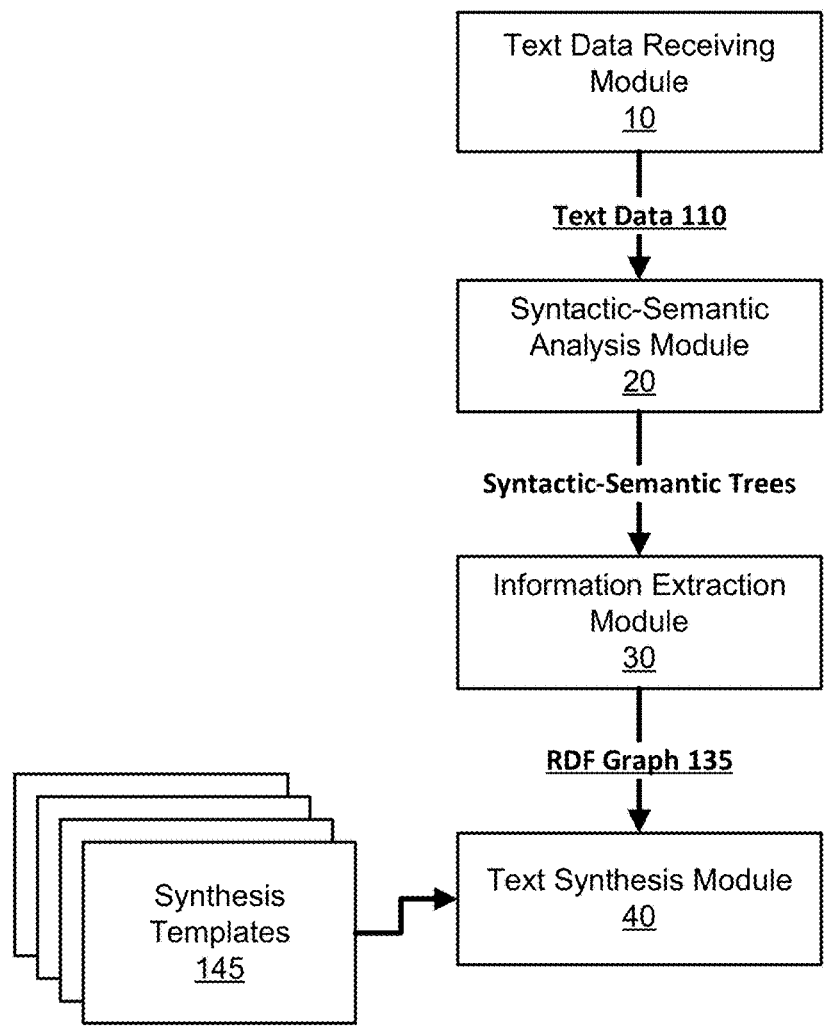
FIG. 1A illustrates a block diagram of an example aspect.

FIG. 1 illustrates the sequence of steps in accordance with an example aspect. FIG. 1A illustrates a system in accordance with an example aspect.

In step 110, text data is input to the system by the text data receiving module 10. This text data may either be previously prepared, i.e., tagged, or not (not tagged). Next, the text data in step 120 is subjected to semantic-syntactic analysis by the syntactic-semantic analysis module 20. The primary principles of the semantic-syntactic analysis based on linguistic descriptions have been specified in the U.S. Pat. No. 8,078,450, incorporated herein by reference in its entirety. Since the semantic-syntactic analysis is based on the use of language-independent semantic units, the present disclosure is likewise independent of language and may function with one or several natural languages.

The semantic-syntactic text analyzer is a module, that is able to analyze text data: an individual sentence, a text or a collection of texts; and obtain for the text data a forest of semantic-syntactic structures, each of which constitutes a graph, in particular a tree. The nodes and edges of the graph are supplemented with grammatical and semantic information to identify objects, their attributes and relations, and also for synthesis of sentences.

Figure 2:
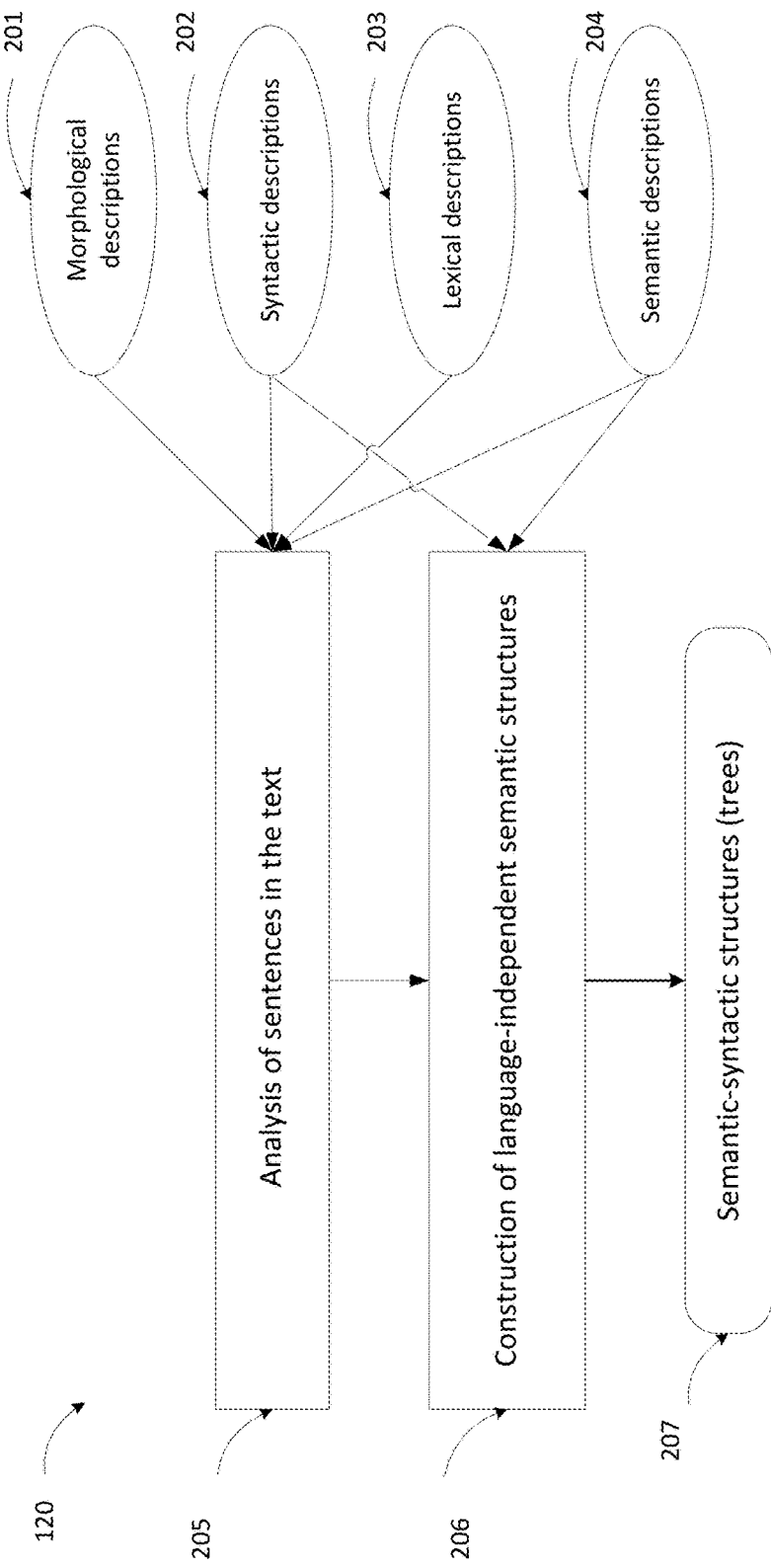
FIG. 2 illustrates a sequence of steps of semantic-syntactic analysis in accordance with an example aspect.

Semantic-Syntactic Analysis:

FIG. 2 illustrates a method of deep syntactic and semantic analysis 120, based on linguistic descriptions of text data presented in natural languages 110. The method is presented in detail in above-referenced U.S. Pat. No. 8,078,450. The method uses a broad spectrum of linguistic descriptions as universal semantic mechanisms. These analysis methods are based on principles of integral and goal-oriented recognition, i.e., hypotheses about the structure of a part of a sentence are verified in the context of a verification of a hypothesis about the structure of the entire sentence. This may avoid the need to analyze a large number of variants.

Deep analysis includes lexical-morphological, syntactic and semantic analysis of each sentence of the text (corpus of texts), as a result of which language-independent semantic structures are constructed for the sentences in which each word is assigned to a corresponding lexical and/or semantic class (SC) in a universal Semantic Hierarchy (SH).

The Semantic Hierarchy (SH) is a lexical-semantic dictionary containing the language's vocabulary needed for the text analysis and synthesis. The Semantic Hierarchy is organized in the form of a tree, where nodes of the tree correspond to Semantic Classes (SC), which are universal for all languages and reflect a certain conceptual meaning, and the Lexical Classes (LC), which are specific to a language, being the descendants of a certain semantic class. The aggregation of lexical classes of a single Semantic Class determines a semantic field—the lexical expression of the conceptual meaning of the Semantic Class. The most widespread concepts are located at the upper levels of the hierarchy.

A child semantic class in the Semantic Hierarchy inherits properties of its direct parent and all ancestor semantic classes. For example, the semantic class SUBSTANCE is a child semantic class of the class ENTITY and a parent semantic class of the classes GAS, LIQUID, METAL, WOOD_MATERIAL, etc.

Referring back to FIG. 2, the source sentences in the text or collection of texts (110) are subjected to semantic-syntactic analysis 205 with the use of linguistic descriptions of both the source language and universal semantic descriptions, which makes it possible to analyze not only the surface syntactic structure, but also identify the deep semantic structure that expresses the meaning of statements contained in sentences, as well as the relations between sentences or fragments of the text. The linguistic descriptions may include lexical descriptions 203, morphological descriptions 201, syntactic descriptions 202 and semantic descriptions 204. The analysis 205 includes a syntactic analysis performed as a two-stage algorithm (rough syntactic analysis and precise syntactic analysis), using linguistic models and information of various levels to compute probabilities and generate a set of syntactic structures. Consequently, in step 206 the semantic-syntactic structure (207) is constructed, or in other words the semantic-syntactic tree which is the best semantic-syntactic structure of the set of semantic-syntactic structures in terms of the given system of evaluations is used in the analysis process.

The morphological model of the semantic-syntactic analyzer exists outside of the semantic hierarchy. For each language there is a list of lexemes and their paradigms. Within the semantic hierarchy, each lexeme may be attached to one or more lexical classes. A lexical class usually links together several lexemes.

Each node of the obtained semantic-syntactic tree is assigned to a particular lexical class of the semantic hierarchy, which presumes that ambiguous words are eliminated during the analysis process. Each node also holds the grammatical and semantic information which determines its role in the text, namely, a set of grammemes and semantemes.

Each arc of the semantic-syntactic tree has a surface position (i.e., the syntactic function of the dependent node, such as $Subject or $Object_Direct) and a deep position (i.e., the semantic role of the dependent node, such as Agent or Experiencer). The set of deep positions is universal and language independent, unlike the set of surface positions, which differs from one language to another.

In this disclosure, the semantic-syntactic analyzer is used both for the deep analysis of sentences in a text presented to the system, by a user for example, and in the process of creation of templates which will then be used for the text synthesis. This routine will be described below.

Extraction of Information:

Referring back to FIG. 1, after the text data presented by the user has undergone the stage of deep semantic-syntactic analysis 120, resulting in the production of a forest of semantic-syntactic trees for each sentence in the text, the information extraction routine 130 is launched by the information extraction module 30. The information extraction module uses the semantic-syntactic trees obtained in the preceding stage.

The information extraction process is controlled by a system of production rules. There are two types of production rules: rules for interpretation of fragments of the semantic-syntactic trees, and rules for identification of information objects.

The rules of interpretation make it possible to describe fragments of semantic-syntactic trees, which, when detected, cause certain sets of logical statements to come into effect. One rule is a production, the left part of which is a standard pattern of the semantic-syntactic tree, while its right part is a set of expressions describing the logical statements.

A pattern of a semantic-syntactic tree (or tree template) constitutes a formula whose atomic elements are verifications of different properties of the nodes of the semantic-syntactic trees (e.g., whether or not a particular grammeme/ sememe is present, what lexical/semantic class does it belong to, is it located in a certain surface/deep position, etc.).

The rules of identification are used in situations when it is necessary to merge (combine) already extracted information objects. A rule of identification constitutes a production whose left part describes the limits to be placed on two information objects, upon the fulfillment of which the information objects are deemed to be congruent. The right part of all rules of identification is deemed to be identical (it is a statement about the identity of the two objects).

Figure 3:
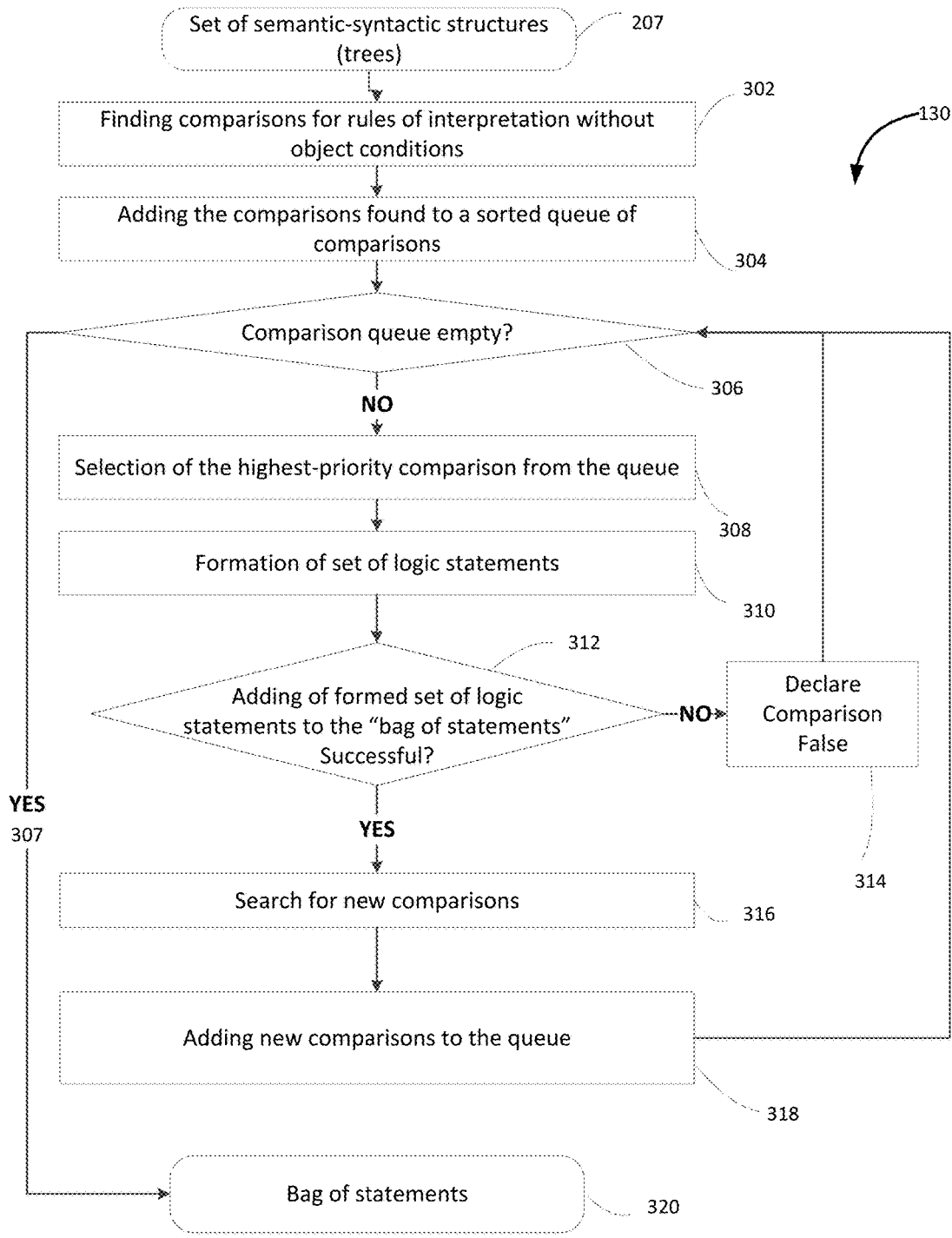
FIG. 3 illustrates a sequence of steps of the method of information extraction in accordance with an example aspect.

The method of extracting information with the use of production rules is illustrated in FIG. 3. As mentioned above, semantic-syntactic trees for each sentence of text presented by the user are input to the information extraction module. In step 302, all comparisons are detected for the rules of interpretation without object conditions (conditions imposed on information objects). The term comparison means a comparison of the tree pattern of a rule of interpretation with a fragment of a semantic-syntactic tree. After this, the detected comparisons are added 304 to a sorted queue of comparisons. In step 306, it is checked whether the queue of comparisons is empty. If the queue of comparisons is empty 307, the process terminates (320). If the queue is not empty, the highest priority comparison is selected 308 from the queue. A set of logical statements is then formed 310 based on the right part of the corresponding rule. The formulated set of logical statements is then added to the "bag of statements" 312. The "bag of statements" is the name for a set of notmutually contradictory logical statements about information objects and their attributes (properties). The logical statements are not arbitrary. There is a limited number of types of logical statements. If this fails, the comparison is marked invalid 314, after which the comparison queue is again checked to see if it is empty. Otherwise, if the set is added successfully, then a search for new comparisons is performed 316. The new comparisons, if any are found, are added to the queue. Execution then returns to step 306. Thus, the "bag of statements" is formed (320), being presented in a certain internal format. The RDF graph is then formed.

According to the RDF (Resource Definition Framework) concept, which is a data presentation model, each information object extracted from the text data in the information extraction process described above is assigned a unique identifier. Specifically, all of the extracted information is presented in the form of a set of triplets <s,p,o>, where s is the identifier of the information object, p is the identifier of its attribute (predicate), and o is the value of the given attribute.

An example of an actual RDF graph is the following:

```
<?xml version="1.0" encoding="UTF-8" standalone="yes"?>
<rdf:RDF xmlns:rdf="http://www.w3.org/1999/02/22-rdf-syntax-ns#"
xmlns:Org="http://www.abbyy.com/ns/Org#"
xmlns:BasicEntity="http://www.abbyy.com/ns/BasicEntity#"
xmlns:BasicFact="http://www.abbyy.com/ns/BasicFact#"
xmlns:Basic="http://www.abbyy.com/ns/Basic#"
xmlns:Aux="http://www.abbyy.com/ns/Aux#">
    <BasicEntity:Person rdf:nodeID="bnode26DA86BA-9F4F-42C2-8196-F2BD7FB76229">
        <Basic:named
rdf:datatype="http://www.w3.org/2001/XMLSchema#boolean">true</Basic:named>
        <BasicEntity:firstname
rdf:datatype="http://www.w3.org/2001/XMLSchema#string"
xml:lang="ru">Александр </BasicEntity:firstname>
        <Basic:label rdf:datatype="http://www.w3.org/2001/XMLSchema#string"
xml:lang="ru">Александр </Basic:label>
    </BasicEntity:Person>
    <Org:Commercial rdf:nodeID="bnode1B8A7B65-A967-4DA0-9EA8-7EFCFCAB6010">
        <rdf:type rdf:resource="http://www.abbyy.com/ns/Basic#Where"/>
        <Org:proper_organization_name
rdf:datatype="http://www.w3.org/2001/XMLSchema#string"
xml:lang="ru">ABBYY</Org:proper_organization_name>
        <Basic:label rdf:datatype="http://www.w3.org/2001/XMLSchema#string"
xml:lang="ru">ABBYY</Basic:label>
        <Basic:named
rdf:datatype="http://www.w3.org/2001/XMLSchema#boolean">true</Basic:named>
        <Basic:identifier rdf:datatype="http://www.w3.org/2001/XMLSchema#string"
xml:lang="ru">ABBYY</Basic:identifier>
    </Org:Commercial>
    <BasicFact:Occupation rdf:nodeID="bnodeA18A6961-6259-4DC8-BB16-F5BC1EEA9523">
        <BasicFact:where rdf:nodeID="bnode1B8A7B65-A967-4DA0-9EA8-7EFCFCAB6010"/>
        <BasicFact:position rdf:datatype="http://www.w3.org/2001/XMLSchema#string"
xml:lang="ru">программист </BasicFact:position>
        <BasicFact:employer rdf:nodeID="bnode1B8A7B65-A967-4DA0-9EA8-7EFCFCAB6010"/>
        <BasicFact:employee rdf:nodeID="bnode26DA86BA-9F4F-42C2-8196-F2BD7FB76229"/>
    </BasicFact:Occupation>
    <Aux:TextAnnotations>
        <Aux:DocumentText xml:lang="ru">
            <![CDATA[Александр работает программистом в ABBYY
]]>
```

-continued

```
    </Aux:DocumentText>
    <Aux:ObjectAnnotation Aux:AnnotationStart="0" Aux:AnnotationEnd="9"
rdf:nodeID="bnode26DA86BA-9F4F-42C2-8196-F2BD7FB76229"/>
    <Aux:ObjectAnnotation Aux:AnnotationStart="19" Aux:AnnotationEnd="32"
rdf:nodeID="bnodeA18A6961-6259-4DC8-BB16-F5BC1EEA9523"/>
    <Aux:ObjectAnnotation Aux:AnnotationStart="35" Aux:AnnotationEnd="40"
rdf:nodeID="bnode1B8A7B65-A967-4DA0-9EA8-7EFCFCAB6010"/>
   </Aux:TextAnnotations>
</rdf:RDF>
```

Ontology

All of the RDF data extracted from the texts is coordinated with a model of the subject field (ontology) in which the information extraction module is functioning. The ontology specifies which attributes the information objects may have and what object relations may exist between them. An ontology is a formal explicit description of a certain subject field. The basic components of an ontology are concepts (or in other words, classes), instances, relations, and attributes. The concepts of an ontology represent a formally defined and named set of instances which are generalized with respect to some features. An example of a concept might be the set of all people combined into the concept "Person". The concepts in an ontology form a taxonomy, i.e., a hierarchical structure. An instance is a specific object or phenomenon of the subject field which is included into the concept. For example, the instance Yury_Gagarin is included into the concept "Person". The relations are formal descriptions between concepts which determine the kind of relationship that may be established between the instances of given concepts.

The data generated by the information extraction module automatically conforms to the model of the subject field. On the one hand, this is made possible by the syntax of the language of the information extraction rules. On the other hand, the special validation mechanisms that prevent the occurrence of ontologically incorrect data are built into the system.

In addition to the RDF graph, which is consistent with an OWL ontology, the storage may contain a collection of document texts and information about the extracted information objects' relationships with the source text (annotation or "highlighting" of objects). The RDF graph along with the information on the annotations of the information objects shall be termed hereinafter the annotated RDF graph.

Referring back to FIG. 1, after the RDF graph is obtained, the text synthesis routine is launched. It may be noted that the RDF graph may be obtained by any other method, different from the one described above. For the obtained RDF graph, a text is generated which conveys the meaning embedded in the facts identified in the operating routine of the information extraction module.

Structure of the Synthesis Module

The text synthesis module is responsible for text creation on the basis of the extracted information presented in the form of the RDF graph.

The architecture of the text synthesis module enables universal use thereof. Specifically, the module does not encode an explicit dependency on any particular natural language or fact, which makes it possible to synthesize text without modification of the text synthesis module itself in the event of expansion of the ontology, such as by adding a user ontology, or adding a new language.

Moreover, the text synthesis module has a built-in filter for the facts being synthesized, that doesn't allow synthesis of text for some extracted facts, such as improperly extracted facts. Furthermore, the module performs a ranking of the output, so that more important generated facts are placed higher than less important generated facts.

The ontologies are supplemented with new ontological objects, or synthesis templates 145 (FIG. 1), for each information object (fact) about which it is necessary to obtain a synthesized sentence. The synthesis templates are created in advance, before the stage of analyzing the input text data presented by a user. The templates are created by the user for each type of information object (in the context of this specification, for each type of fact which might be defined in the text data presented by the user). A detailed description of the creation of the templates is presented below.

Creation of a Template

The synthesis of text based on the information objects extracted in step 130 (in a specific example, based precisely on extracted facts) is performed with the use of compiled templates 145. Templates are created by the user for each type of fact. It is possible to create several templates for each fact. An illustrative description of a template is presented below. The illustrative description of a template which is given below does not limit the scope of the disclosure.

In one aspect, the template includes the following components:

a sentence in one of the natural languages;
a reference to the language in which this statement is written;
a list of substitutions in the form of "part of the sentence (in the disclosure, the part is a word of the sentence) from the template"—its corresponding "property". The larger the list of substitutions, the more accurate is the template;
a list of required properties of the information object (in this aspect, a fact);
a validation script;
a reference to a library in which the given template is being kept.

The sentence (hereinafter, "template sentence") in one of the natural languages is the foundation of the template. The list of substitutions refers to the template sentence. The template sentence is used afterwards in constructing the text synthesis tree.

Consider the fact "Occupation", which was extracted from the text by means of the information extraction module. This fact corresponds to an employment. In the most of cases, the fact "Occupation" may be formulated in general as: "So and so works somewhere as so and so". For example, the sentence: "Alexander works as a programmer at ABBYY" can be used as a template sentence for the fact "Occupation". The list of substitutions for this template is as follows:

"Alexander"—employee;
"programmer"—position;
"ABBYY"—employer, where "Alexander", "programmer" and "ABBYY" are words from the template sentence; and "employee", "position", and "employer" are their corresponding properties. The list of substitutions for the template is created by the user. The larger the list of substitutions, the more accurate the template.

In addition, the template may indicate the properties from the list of substitutions which have to be fulfilled in the extracted information object. Required properties impose the following condition on the use of the template: if one of the required properties of the template is not fulfilled for the extracted information object (fact), the given template will not be used for the text synthesis. The list of required properties of the template from the above-given example includes two out of three possible properties, namely, the properties "position" and "employee". These properties must be fulfilled in the extracted fact in order to use the aforementioned template "Alexander works as a programmer at ABBYY". An optional property of the extracted fact may remain unfulfilled and the template will still be used. For example, if the property "employer" is not fulfilled in the extracted fact (this property does not enter into the list of the required properties of the above-given example), this template may still be used for the text synthesis.

The validation script may impose certain limitations on properties of extracted facts. The validation script to a certain degree takes part in the filtering of facts in order to produce the synthesis. As the validation script here, it may use a script (condition) to verify whether the property "employee" in the extracted fact is nominative, i.e., a proper name. This makes it possible to filter out "garbage" (mistakenly identified in the text) facts. For example, if the validation script does not impose the condition that the property "employee" of the extracted fact is nominative, the text synthesis might produce the following sentence: "Programmer works as a programmer".

Compilation of the Template

Figure 4:
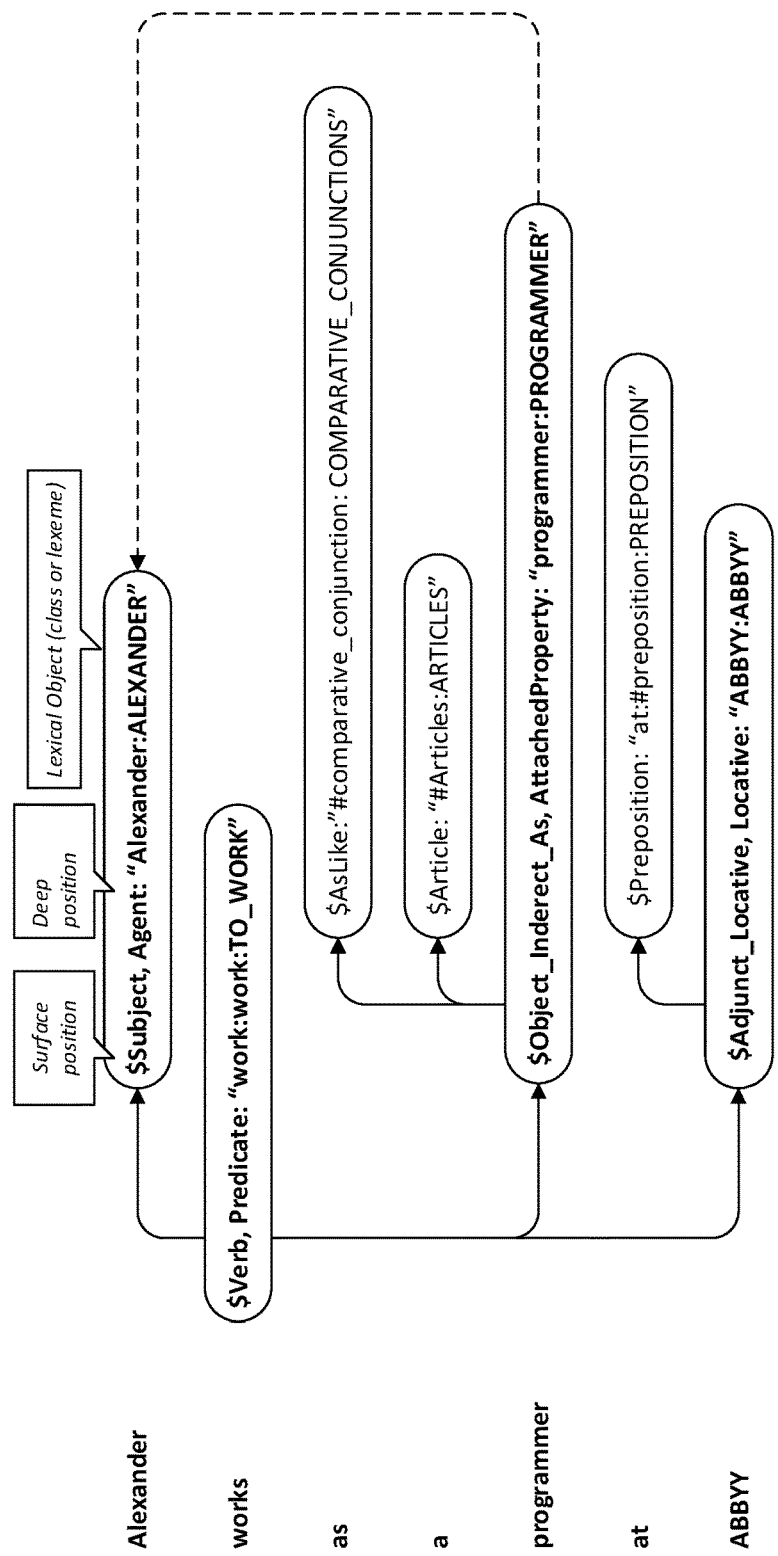
FIG. 4 illustrates a semantic-syntactic tree of an example template sentence.
Figure 5A:
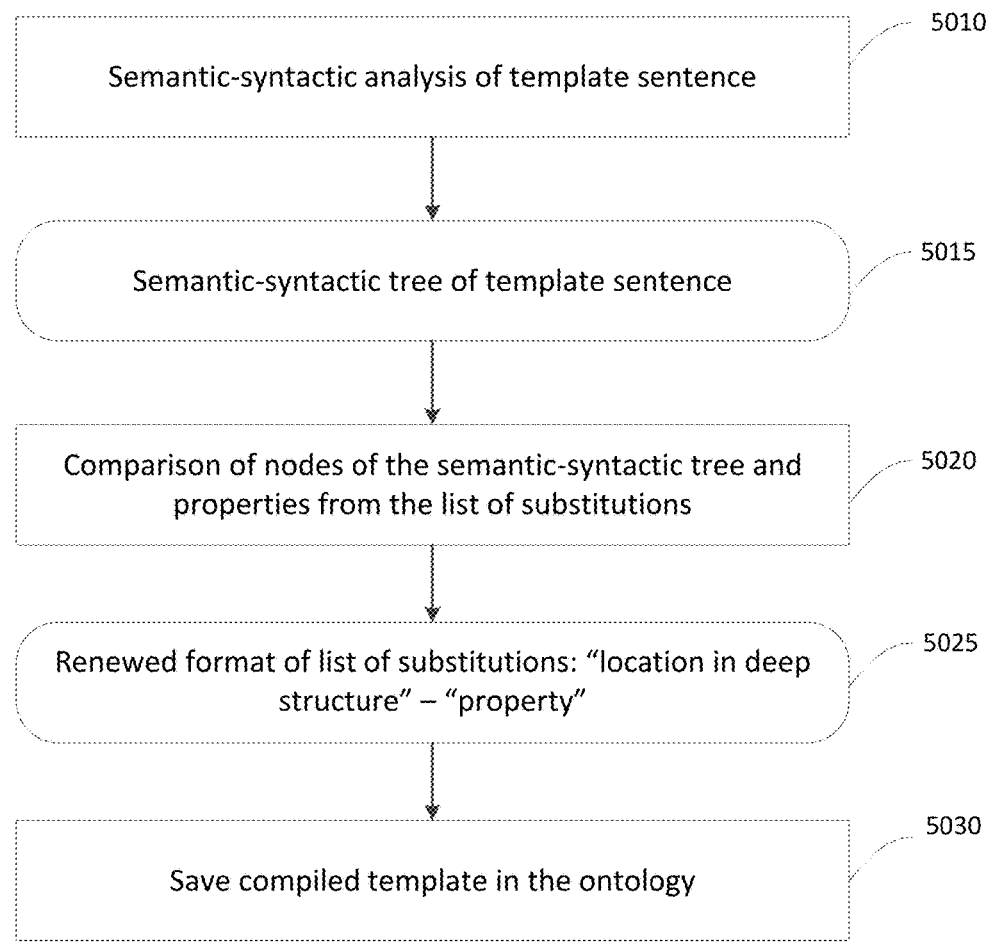
FIG. 5A illustrates a routine for compilation of a template.

In order to use a sentence in a natural language as a template, the template compilation routine is launched. FIG. 5A illustrates the template compilation routine. Part of the template compilation is semantic-syntactic analysis 5010, resulting in creation of a semantic-syntactic tree 5015 which will be used to produce the text synthesis. The semantic-syntactic analysis is described in FIG. 2. The nodes of the semantic-syntactic tree are the words from the sentence and are assigned to a particular lexical class from the Semantic Hierarchy (SH). In addition, the nodes contain grammatical and semantic information about the language (sets of grammemes and semantemes), characterizing the specific use of the corresponding word in the context of the sentence. The branches of the semantic-syntactic trees represent the deep positions (i.e., the semantic role of the dependent word, such as Agent) and the surface positions (i.e., the syntactic function of the dependent word, such as $Subject). FIG. 4 illustrates a semantic-syntactic tree of the template sentence Alexander works as a programmer at ABBYY. The nodes of the tree are the words from the sentence.

After the semantic-syntactic tree has been constructed for the template sentence, the nodes of the semantic-syntactic tree are compared with the properties from the list of substitutions of the template 5020. The comparison is done automatically. In the semantic-syntactic tree a search is made for components (nodes) corresponding to the words given in the list of substitutions for the template. These components (nodes) of the semantic-syntactic tree are associated with the properties given in the list of substitutions. For example, the node "Alexander" in the semantic-syntactic tree in FIG. 4 is associated with the property "employee", the node "programmer" is associated with the property "position", and the node "ABBYY" is associated with the property "employer". The format of the list of substitutions changes: the properties are not associated with the words from the template sentence; rather, the properties are associated with the position in the deep structure (the node of the semantic-syntactic tree) of the sentence. The format of the list of substitutions is: "position in the deep structure" of the template sentence—its corresponding "property" 5025.

The results of the compilation of the created template—namely, the semantic-syntactic tree, the list of substitutions in which the properties are associated with the position in the deep structure of the template sentence, the list of required properties of the template, the language of the template sentence, and the validation script—are saved 5030 in the ontological model as an object of a particular type—a "compiled template" or a synthesis template.

A certain set of compiled templates is attached to an existing concept of the ontology, such as the concept "BasicFactOccupation". Thus, the concept in the ontology to which the templates are attached saves a reference to a plurality of templates existing therefor, which may be used for the given concept during the text synthesis. This is useful in order to be able to determine the set of templates pertaining to an information object (in the given specification, to a fact) which may be used for the text synthesis on the basis of this fact. Then a suitable template for the text synthesis is selected from this plurality of templates.

Structure of the Information Objects of the Information Extraction Module

There may be different types of information objects. For example, an information object may be a fact, a person, or a location. The type of the information object refers to the corresponding concept from the ontology: "BasicFact"; "Person"; "Location". In the information extraction process, a "bag of statements" is created—a set of not mutually contradictory logical statements about the information objects and their properties. The end result of the working of the information extraction module may be an RDF graph. In accordance with the RDF (Resource Definition Framework) concept, which is a data presentation model, each information object is assigned a unique identifier. Specifically, all of the extracted information is presented in the form of a set of triplets <s,p,o>, where s is the identifier of the information object, p is the identifier of its attribute (predicate), and o is the value of the given attribute.

As mentioned above, within the information extraction module each information object extracted in the course of the text analysis has a set of properties and values of the given properties. Within the task of text synthesis making use of the RDF graph, the values of the properties of the extracted information object (fact) are examined which correspond to the properties used in the template(s) for the given fact.

The properties may be conventionally divided into two types. The first type includes properties which may be explicitly presented in the template. Examples of such properties are: the name of a person, the title of a position, the name of an organization, and so on. Thus, the value of the property "position" is always represented by a text string, and therefore it will appear explicitly in the template.

The second type includes properties which do not appear explicitly in the template. Such properties may be: the degree of trust of the extracted information object (fact), the degree of completion of an action, and so on. These properties are included in the list of required properties and their presence in the extracted information object (fact) is checked by the validation script.

During the text synthesis both types of properties are processed. The values of the properties of the first type refer to the string type. If the property is an information object, all such objects will have the property "label". For example, the extracted fact "Occupation" has the property "employer", the value of this property being an information object with the concept "Organization", in whose name (and concurrently in the label) it is indicated "ABBYY".

In this property the system places some short readable information about the information object in the form of a string, which is sufficient during the synthesis. Examples of such information objects will be: "Pavel Durov" for a person, "ABBYY" for an organization, and so on.

After referring the value of the properties to the string type, the string is subjected to semantic-syntactic analysis, and it is incorporated into the deep structure (or in other words, into the semantic-syntactic tree) of the sentence being synthesized. In order to understand where the analyzed string (values) of the property needs to be placed in the deep structure of the sentence being synthesized, the list of substitutions is used. The format of the list of substitutions is: "position in the deep structure"—"property".

In the illustrative example of the template sentence "Alexander works as a programmer at ABBYY", given above, the node "Alexander" will be substituted with the property "employee", the node "programmer" will be substituted with the property "position", and the node "ABBYY" will be substituted with the property "employer". Consequently, during the text synthesis on the basis of the new extracted fact "Occupation" of this template, the template will be filled with the values of the properties of the already extracted fact and a new sentence will be synthesized. The synthesis procedure on the basis of templates is described in more detail below.

If there are no values for the property from the list of substitutions of the template for the extracted object (fact), i.e., the indicated property remains empty, then the word corresponding to this property is removed from the tree of the sentence being synthesized. However, if not a single property is filled the meaningless phrase "works" is synthesized. To prevent this from happening, the templates have lists of required properties, as indicated above. If even one property from the list of required properties is missing, this template may not be used for the text synthesis.

The properties of the second type are not explicitly inserted into the sentence itself during the synthesis, but they may alter its structure or an individual word. Such properties do not have a readable parameter "label". One of the possible variants for processing is to write a separate template for each value of the property and their groups, since there are not many properties of the second category for the fact (one through five), or values of such properties (not more than four). An example of such a sentence is "Alexander finished working at ABBYY in 2010"; in the property for "degree of completion of the action" there will stand "finished". However, the problem arises of selecting the appropriate template for the fact, since the number of properties that are required and fulfilled for the template might be the same, and the only difference will be the value of the specific property. The validation scripts are used to handle this problem.

The validation scripts may be used to assign conditions for verification of extracted facts, thereby creating accurate templates. The validation scripts may inherit the syntax of the rules of extraction from the information extraction module, and may have access to properties of the information object extracted from the text. The validation scripts may determine the type and value of a property, and in the event that the property is also an information object, obtain access to the properties of that object. After being launched, the validation script indicates whether or not the template is suitable for the synthesis.

Checking of the Information Object (Fact) for Possibility of its Taking Part in the Text Synthesis and Subsequent Selection of the Template Therefor After conducting the semantic-syntactic text analysis (120, FIG. 1) and the working of the information extraction module 30 (at step 130, FIG. 1), the RDF graph (135, FIG. 1) is put into the text synthesis module 40 (at step 140, FIG. 1) and used afterwards for the text synthesis.

Figure 1B:
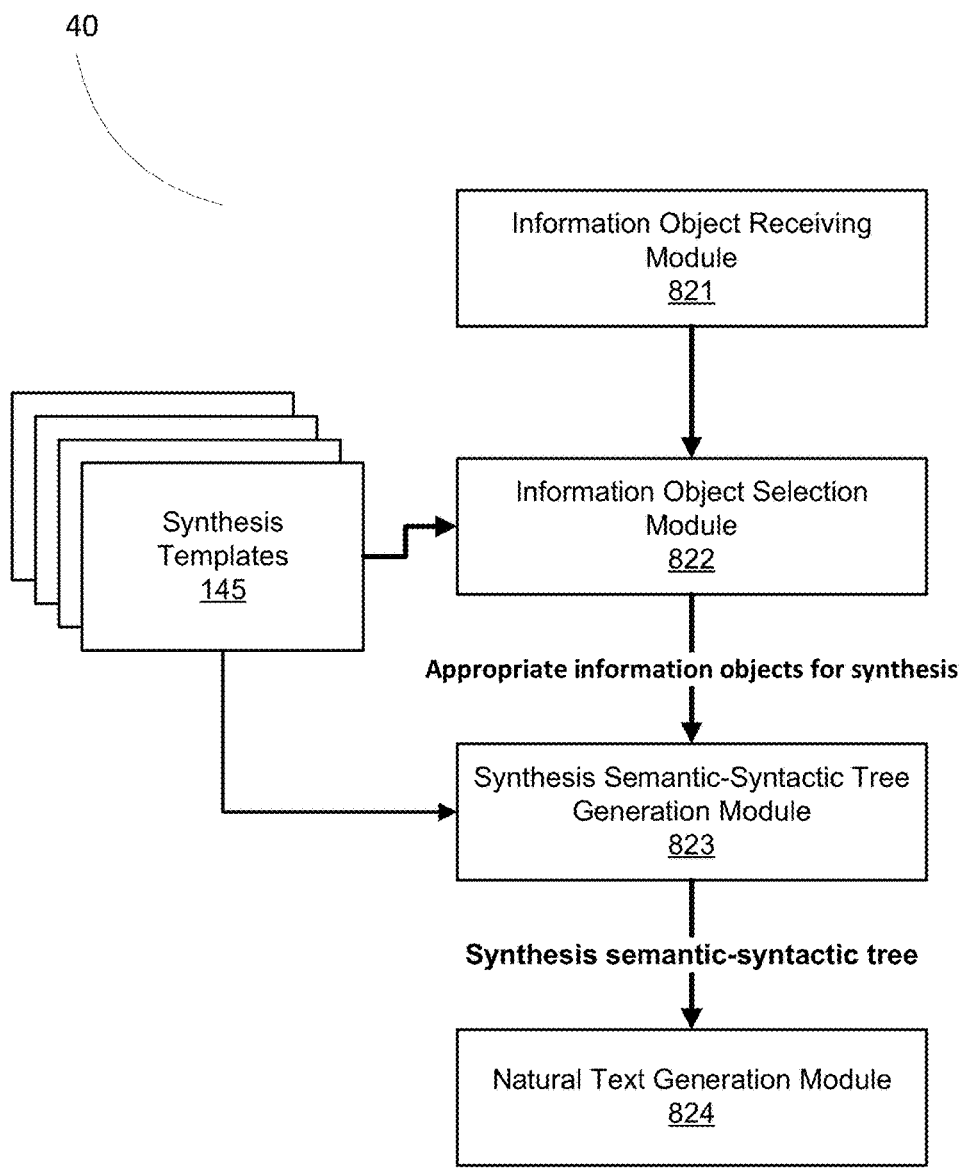
FIG. 1B illustrates a block diagram of another example aspect.
Figure 1C:
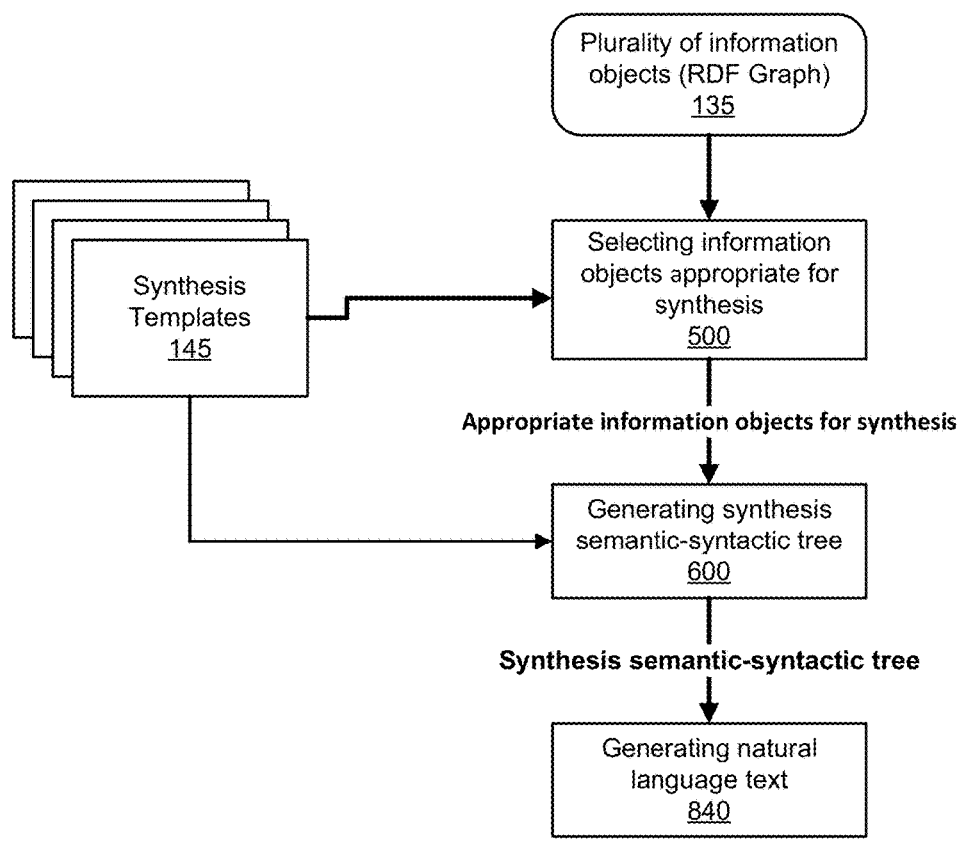
FIG. 1C illustrates a sequence of steps in accordance with another example aspect.

The text synthesis module 40, as shown in FIG. 1B, operating as shown in FIG. 1C, may include a information object receiving module 821 receiving a plurality of information objects forming an RDF graph 135. The text synthesis module 40 may further include an information object selection module 822 selecting among the received information objects those which may be used for text synthesis using the synthesis templates 145 in step 500 (further detailed below in FIG. 5B). After the appropriate objects for the text synthesis are selected, in step 600 (further detailed below in FIG. 6), the synthesis semantic-syntactic tree generation module 823 generates a synthesis semantic syntactic tree using the synthesis templates 145. In the step 840, the generated synthesis semantic syntactic tree is used for generating natural language text by the natural text generation module 824.

From the obtained RDF graph information objects are identified for which it is possible to perform the synthesis, i.e., those information objects extracted from the text for which at least one template exists that is suitable for the synthesis. The creation and compilation of templates for each type of fact has been described above. FIG. 4 shows an example of an RDF graph constructed as a result of the working of the information extraction module on the basis of the semantic-syntactic structure of the sentence "Alexander works as a programmer at ABBYY", illustrated in FIG. 4.

Figure 5B:
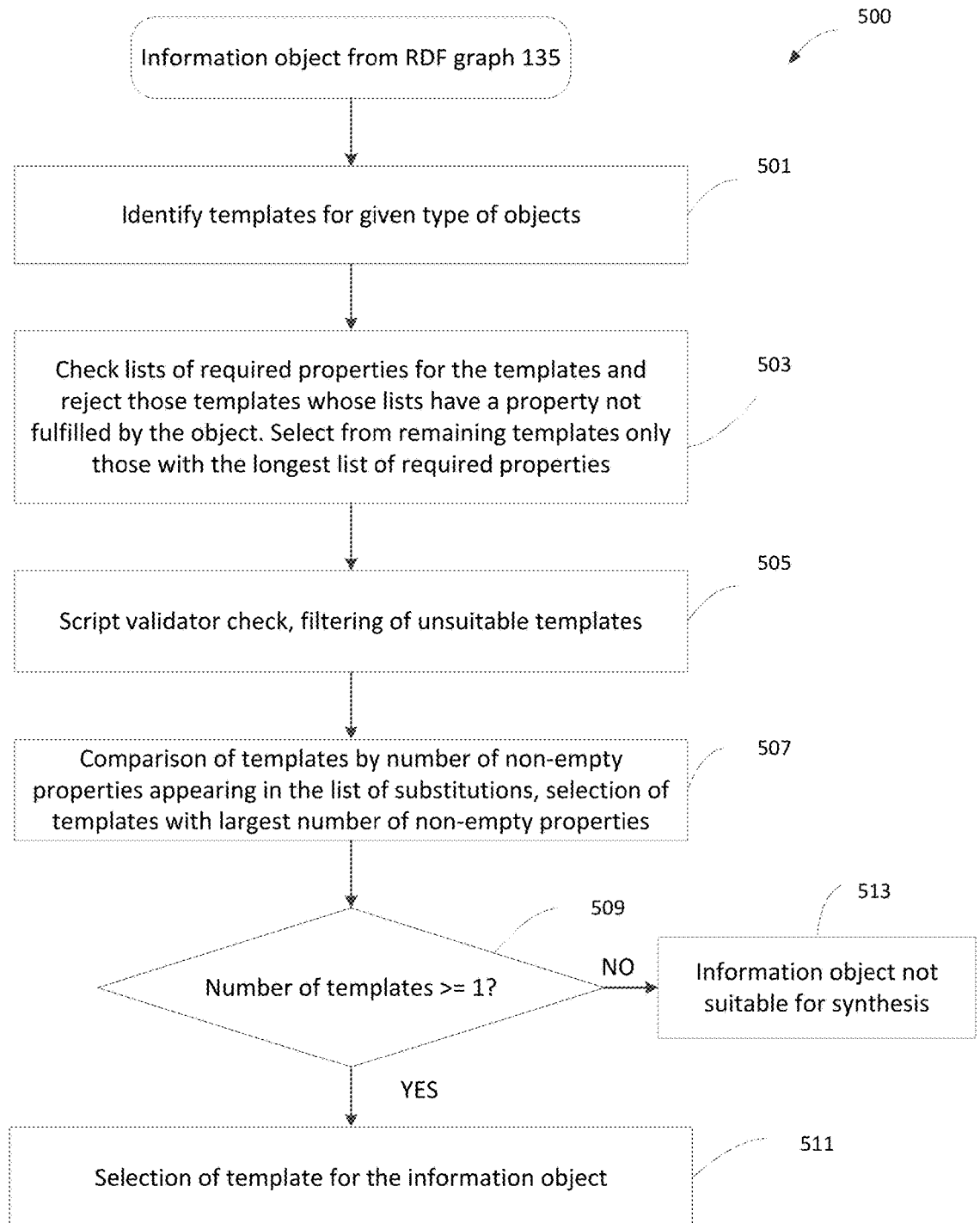
FIG. 5B illustrates a sequence of a routine for checking an information object from a RDF graph.

FIG. 5B illustrates a sequence of a routine for checking an information object in an RDF graph (135, FIG. 1) for the possibility of its participation in the text synthesis, and also the selection of a template which is suitable for this information object in accordance with one aspect. If no templates satisfy the conditions of the check during the selection process, the current extracted information object (fact) is not suitable for text synthesis.

In step 501 a set of templates is formed for the given type of extracted information object (fact). Since the extracted information object is a concept or instance of an ontology, these templates may be saved (5030, FIG. 5A) in the ontology as an ontological object of a particular type. A concept from the ontology, as described above, contains a reference to a certain file of templates which may be used during the text synthesis. For example, for the concept BasicFactOccupation "Occupation" several compiled templates may exist: "Vasya has found a job as a programmer in the USA"; "Vasya is a former programmer"; "Vasya is a programmer"; "Vasya was a programmer".

Next, in step 503, for each template from the set of templates formed in step 501 a check is performed for the lists of properties that have been indicated as required properties. In particular, the fact is checked for whether the required properties in the template are fulfilled by the given extracted object/fact. At this stage, those templates are excluded from further consideration whose lists of required properties have even one property that is not fulfilled for the information object extracted from the text.

From the remaining templates, only the templates with the longest list of filled properties are selected. This stage is needed to select the most accurate templates for the extracted information object (fact), i.e., the more properties are labeled as required in the template, the more accurately the template will synthesize the sentence based on the fact.

In step 505, additional stages are initiated in the checking process of the templates by means of the validation script, and those templates which do not pass this check stage are eliminated from further consideration. As described above, the validation script imposes certain conditions on the checking of the extracted information object (fact), the properties of this fact, and so on.

The remaining templates are compared (507) in terms of the number of non-empty properties which appear in the list of substitutions, and templates whose list of non-empty properties are the largest are selected. If, as a result of this analysis, more than one template remains, a template (511) may be selected (e.g., randomly, etc.). If no templates remain, the information object extracted from the text is not suitable for the synthesis (513).

The procedure described in FIG. 5B enables checking of information objects extracted from the text for their possible participation in the text synthesis.

Construction of the (Semantic-Syntactic) Synthesis Tree

After determining extracted information objects (facts) suitable for text synthesis and selecting a suitable template for each information object, a separate synthesis tree is generated on the basis of the (semantic-syntactic) tree of the template. The procedure is described below with respect to FIG. 6.

According to one example aspect, in step 601 the semantic-syntactic tree that was constructed for the template sentence is entered. This is the basis for the deep structure of the sentence being synthesized, and it enters the synthesis module.

In step 603, the method traverses the semantic-syntactic tree (from a root to leaves) of the template sentence. In parallel with the traversing of the semantic-syntactic tree (from the root to the leaves) of the template sentence, a synthesis semantic-syntactic tree is created. Each node of the semantic-syntactic tree of the template sentence is checked for its presence in the list of substitutions 605 of the given template. Specifically, in step 605 it is checked whether a node of the semantic-syntactic tree of the template sentence exists in the list of substitutions.

If the node in the semantic-syntactic tree of the template, corresponding to a word in the sentence, is not present in the list of substitutions, the synthesis tree creates a full analogue of this node in the semantic-syntactic tree of the template (609). Then its child nodes are analyzed in the semantic-syntactic tree of the template (617).

Figure 6:
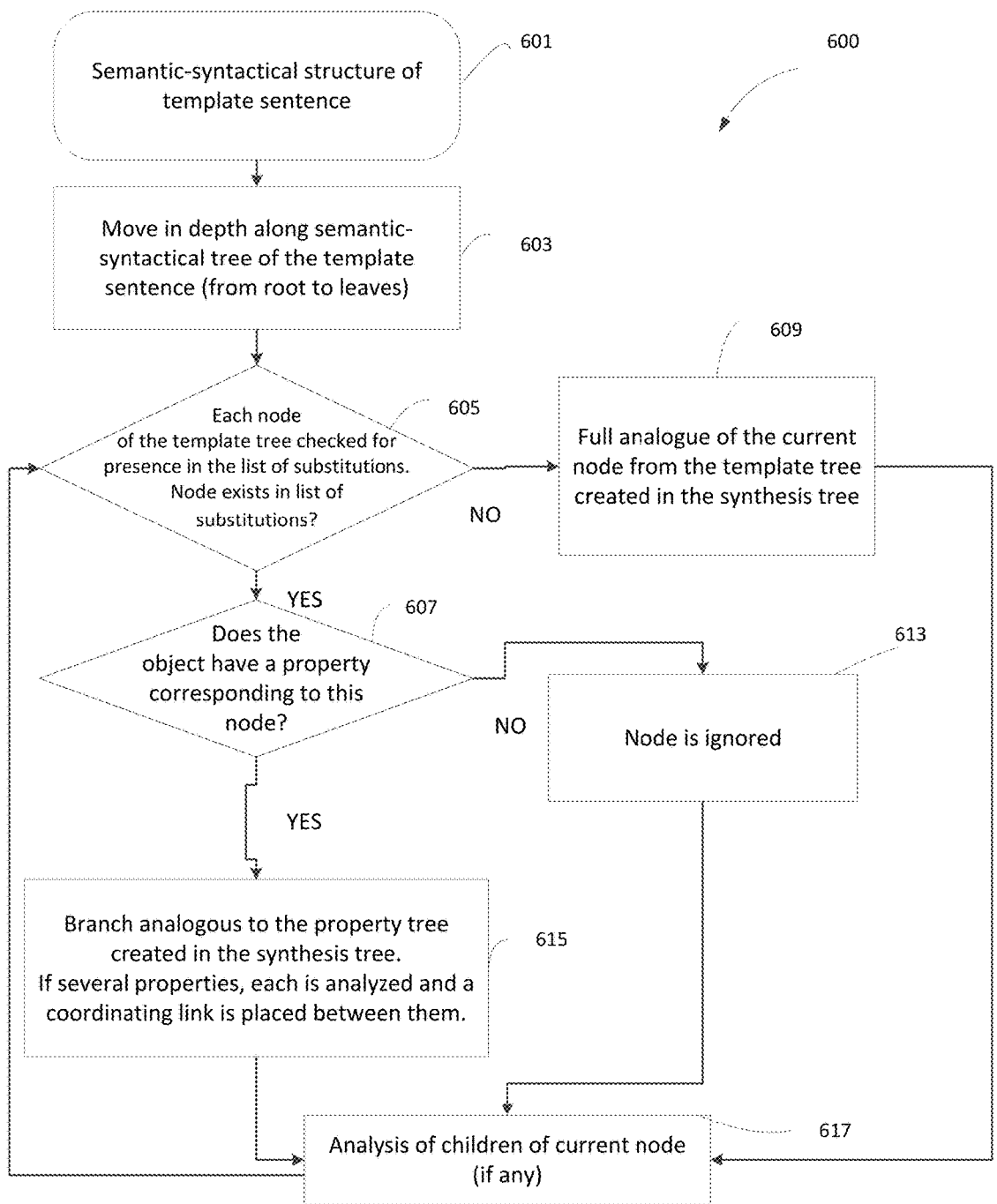
FIG. 6 illustrates a sequence of a method of filling in deep structure of a sentence for synthesis in accordance with an example aspect.
Figure 7A:
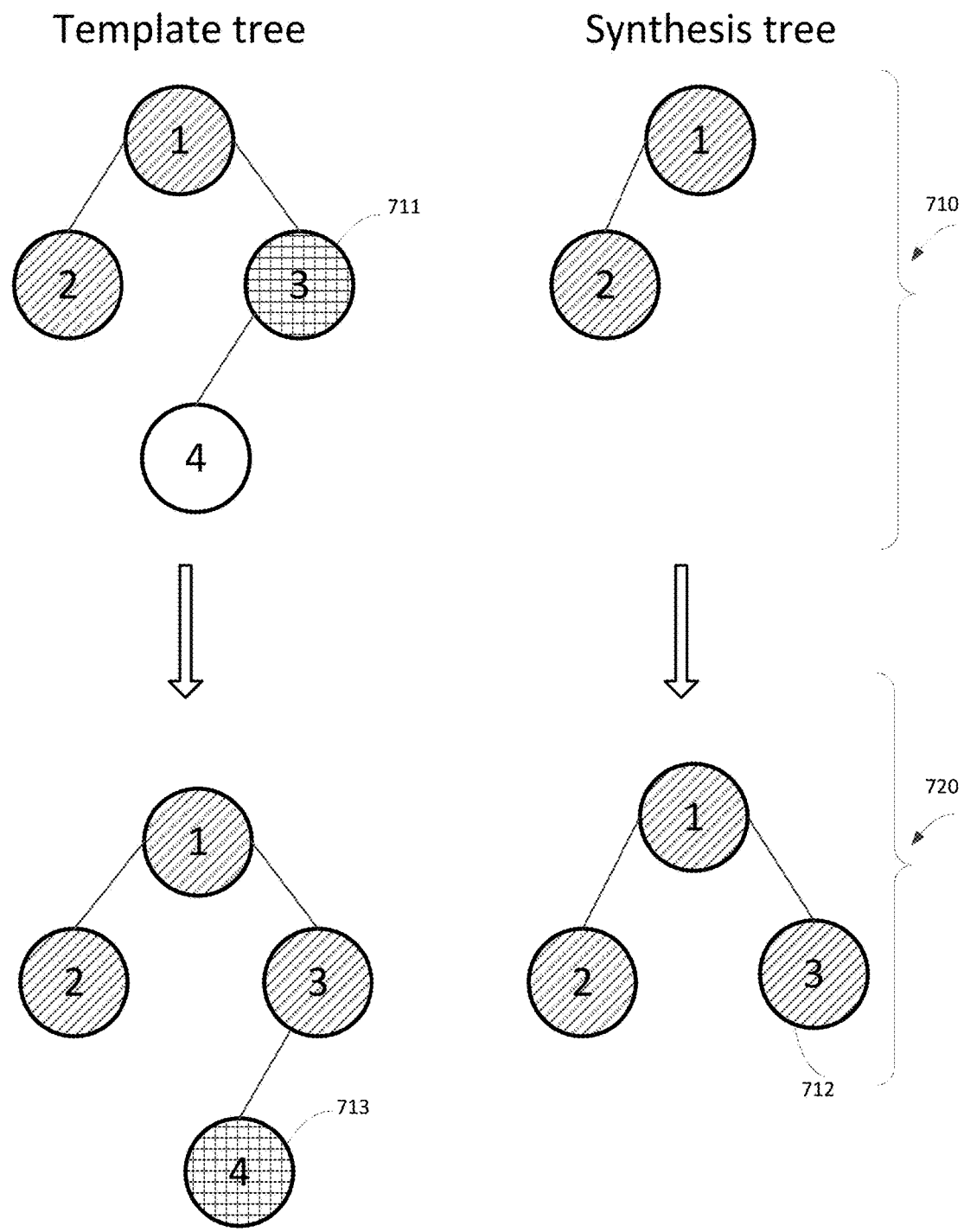
FIG. 7A illustrates trees of template sentences used as the basis for creating corresponding synthesis trees.

FIG. 7A illustrates the above-described case (609). FIGS. 7A-7E illustrate schematically the trees of the template sentences used as the basis for creating the corresponding synthesis trees. In stage 710, after having processed the nodes 1 and 2 in the tree of the template sentence, the node 3 is examined (711). This node is not included in the list of substitutions for the template. Therefore, according to the block diagram in FIG. 6, in stage 720 a full analogue of the current node from the template tree (712) is created in the synthesis tree, preserving the inheritance from the first node. Next, the child node 713 in the template tree is analyzed. An example of the above-described case may be the following sentence: "Yevgeni has been working as a designer at Yandex since 2011". In this sentence, the node designating the date (2011) is not on the list of substitutions for the template example mentioned above.

Referring back to FIG. 6, if the node is present in the list of substitutions, it is checked 607 whether the property corresponding to this node exists. Thus, if the node is present in the list of substitutions, but the property is lacking in the information object (that is, it was not fulfilled for the given extracted fact) corresponding to this node, then this node is ignored 613, and its children 617 are analyzed. In an example "Anna is working at ABBYY" the property "position" will not be fulfilled, although this property appears in the template.

Figure 7B:
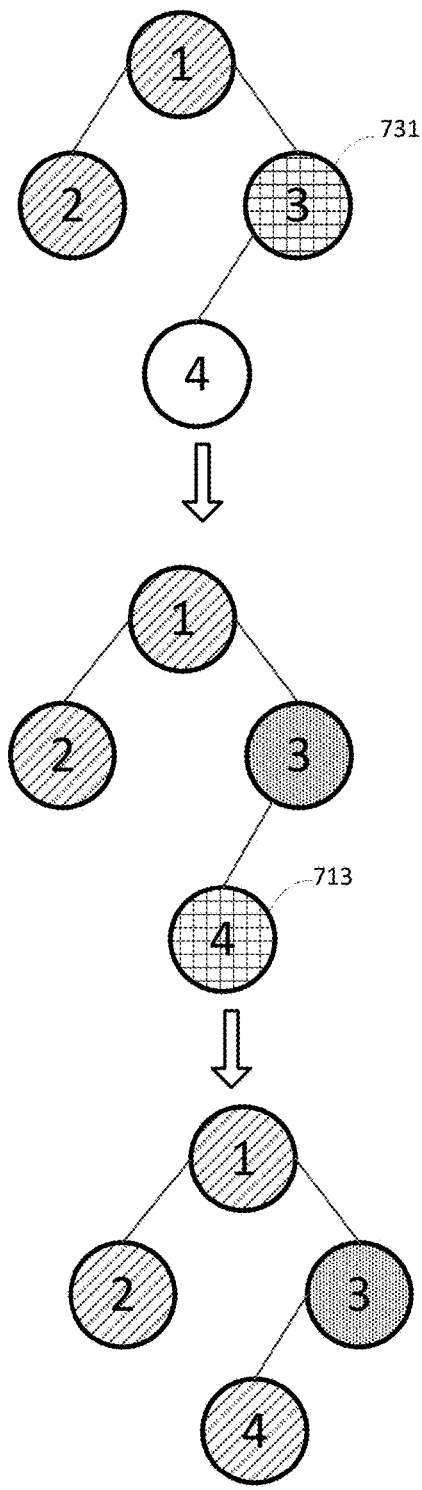
FIG. 7B illustrates trees of template sentences used as the basis for creating corresponding synthesis trees.
Figure 7B:
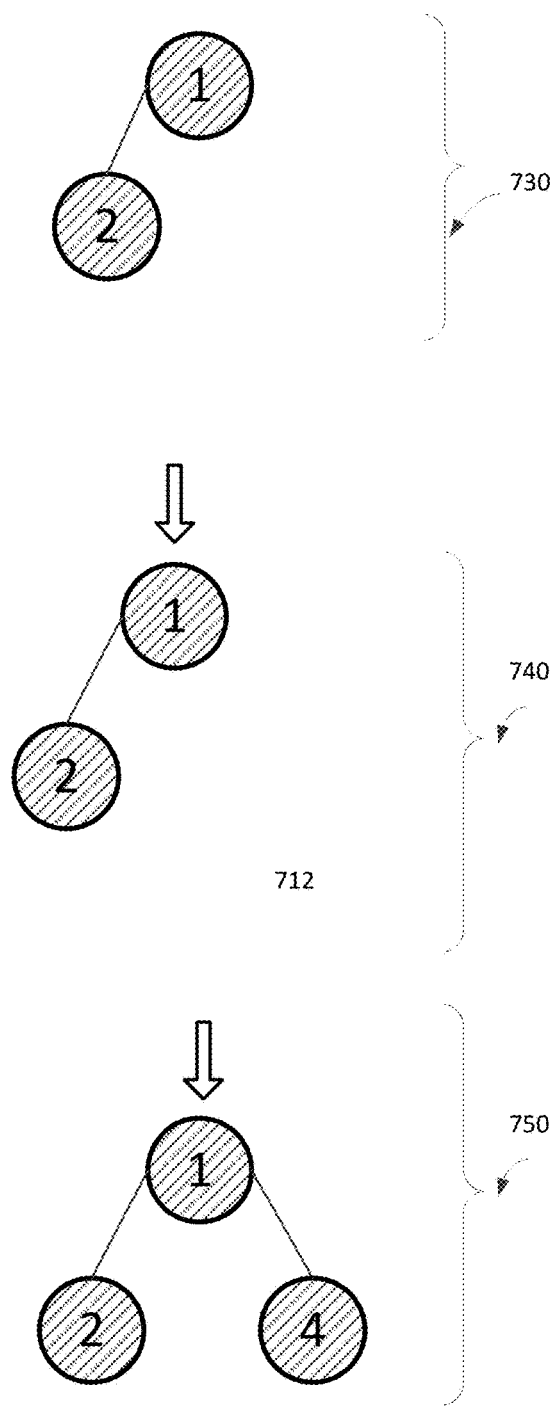

FIG. 7B illustrates this case. At point 730 in the synthesis tree the node 3 is analyzed (731). This node exists in the list of substitutions, but the information object lacks the property corresponding to this node. This node is ignored, and it is not constructed in the synthesis tree in stage 740. Next, the child node 4 is analyzed in the template tree (742), and its full analogue is attached to the synthesis tree.

Figure 7C:
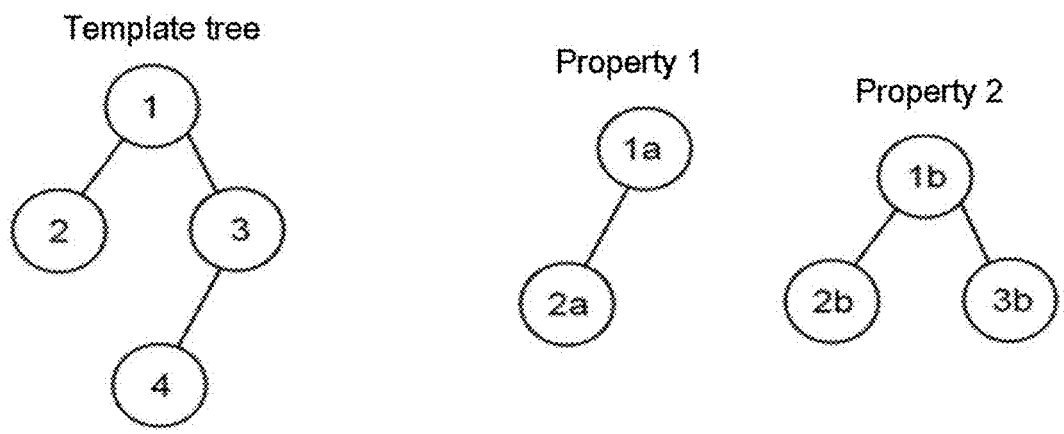
FIG. 7C illustrates trees of template sentences used as the basis for creating corresponding synthesis trees.
Figure 7D:
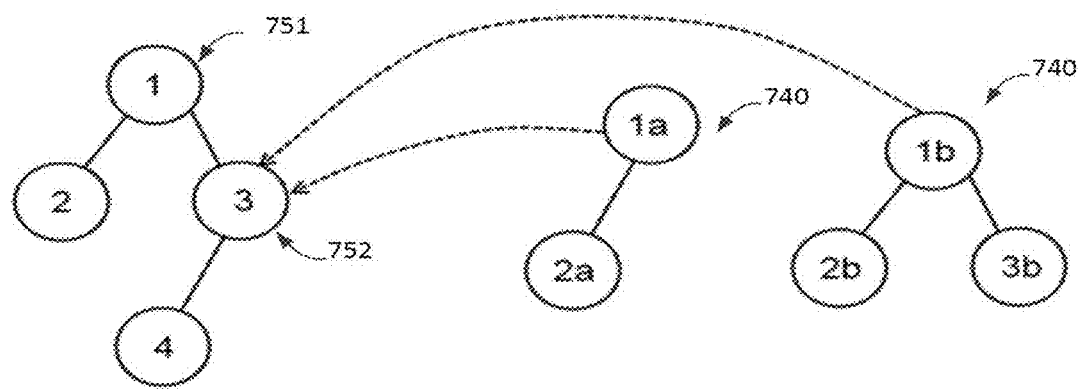
FIG. 7D illustrates trees of template sentences used as the basis for creating corresponding synthesis trees.
Figure 7E:
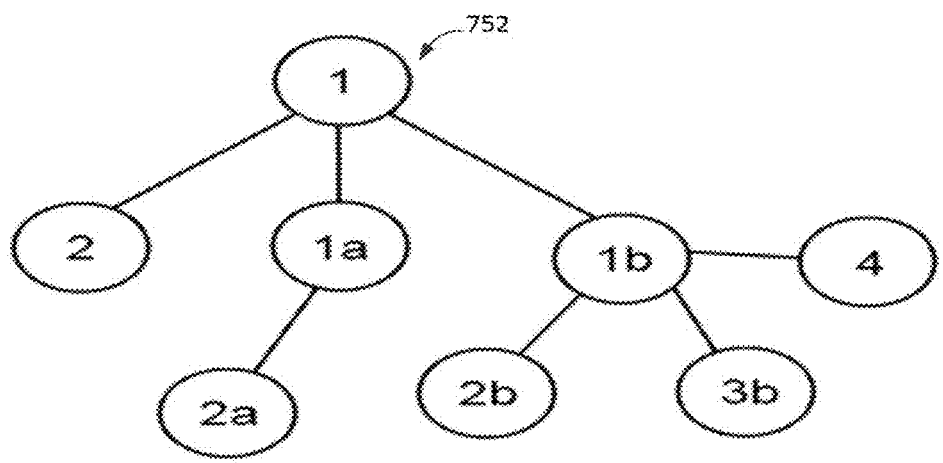
FIG. 7E illustrates trees of template sentences used as the basis for creating corresponding synthesis trees.

Referring back to FIG. 6, if the node is on the list of substitutions and the property corresponding to this node exists in the object, in this case 615 a branch is created in the synthesis tree, analogous to a "subtree" of the property in the template tree. This subtree of the property is constructed on the basis of an analysis of the string value of the property of the object using the semantic-syntactic analyzer. If there are several properties, each property is analyzed and a coordinating link is placed between them. Then the method returns to the analysis of the children of the current node. FIGS. 7C-7E illustrate this case. FIG. 7C shows the template tree. Thus, the node 3 (751) is present in the list of substitutions and the properties "properties 1" and "properties 2" corresponding to this node exist in the object. Properties 1 and properties 2 also have their own parsing "subtrees", which were obtained as a result of the semantic-syntactic analysis of the string value of these properties. In the synthesis tree 752 branches are created which are analogous to the "subtrees" of the property (740) and (742), which replace the node 3 (752). These subtrees form a coordinating link with each other. FIG. 7E illustrates the resulting tree for synthesis. For example, "Mikhail works at IBM and MIPT."

After the synthesis semantic-syntactic tree has been constructed on the basis of the template semantic-syntactic tree, the text generation or synthesis takes place, as is described in detail in: US Patent Application Publication No. US 2008/0091405, incorporated herein by reference in its entirety; US Patent Application Publication No. US 2008/0086298, incorporated herein by reference in its entirety; U.S. Pat. No. 8,195,447, incorporated herein by reference in its entirety; and U.S. Pat. No. 8,214,199, incorporated herein by reference in its entirety. The input of this module receives information about a language (the output language) in which the text synthesis has to be performed and the semantic-syntactic tree, in which each node is assigned to a semantic class, lexeme, semantemes, pro-form and syntactic paradigm, and the edges indicate the surface and deep positions. Besides the semantic-syntactic tree, it is possible to use any treelike outcome of analysis of the sentence. As noted above, each node of the semantic-syntactic tree is assigned a semantic class, lexeme, semantemes, pro-form and syntactic paradigm, and on the edges of the tree indicate the surface and deep positions. The synthesizer then constructs the sentence according to the specified tree, on the basis of knowledge about the particular language which is contained in morphology dictionaries.

Synthesis of Homogeneous Facts

Homogeneous facts may be encountered during text analysis. If a separate sentence is synthesized for each fact extracted from the text, a large number of sentences for identical facts may be generated in the synthesized text. For example, the following sentences might be synthesized in this manner: "Alexander works as a programmer at ABBYY" and "Nikolai works as a programmer at ABBYY". It is optimal to combine these sentences and synthesize a single sentence which will include both facts in it. This reduces the size of the synthesized text and improves its quality.

Figure 8:
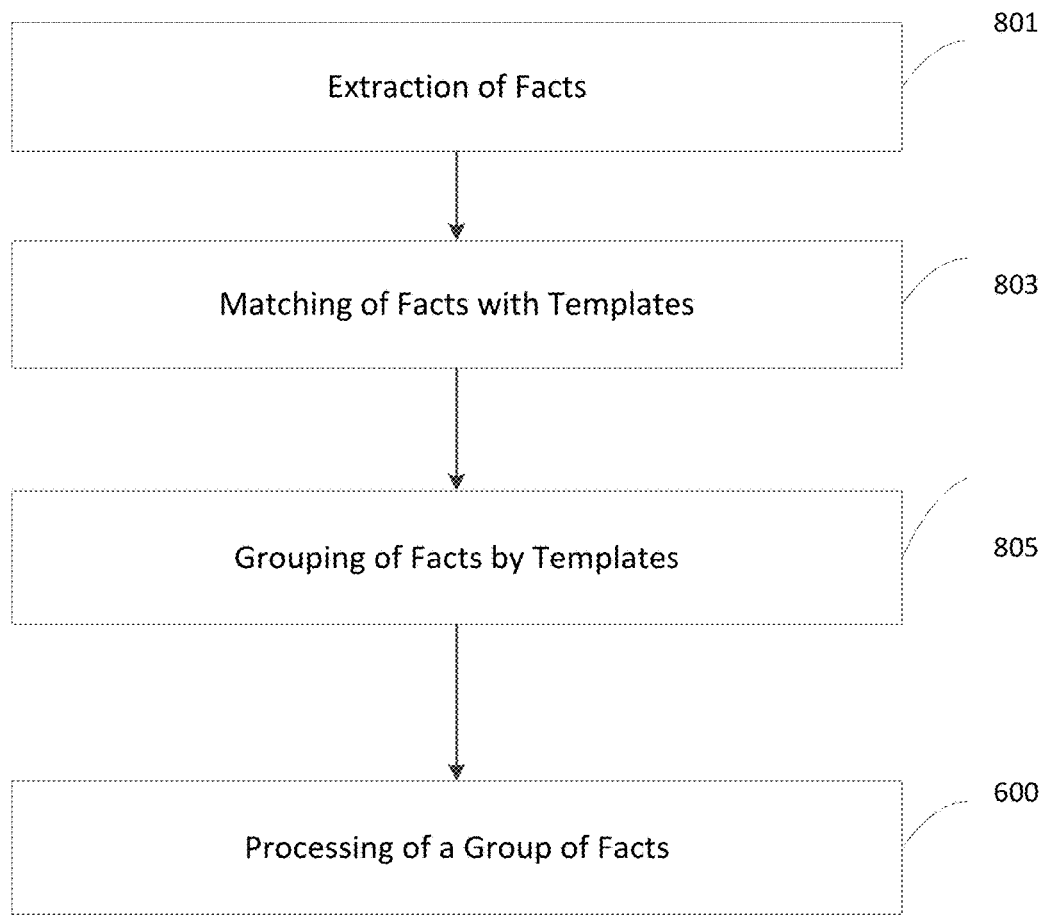
FIG. 8 illustrates a sequence of steps during synthesis of homogeneous facts in accordance with an example aspect.

FIG. 8 illustrates a scheme for synthesis of homogeneous facts. First of all, it is necessary to determine which facts should be combined. For this, the following limitations must be considered.

Firstly, the facts need to be homogeneous. Homogeneous are facts pertaining to the same concept in an ontology, and for which the identical properties should be fulfilled from the standpoint of the template. If the facts are not homogeneous, then a distortion of one of these facts will occur after the synthesis, or some information may be lost.

Secondly, too many facts should not be combined into a single sentence, otherwise the sentence will be overloaded. For this, a certain threshold is established when combining homogeneous facts.

Thirdly, not more than one property should be different in the objects being combined. If there are two or more distinguishing properties, it will be hard to determine in the resulting sentence which property refers to which object. Otherwise, the following sentence might be obtained in the text synthesis: "Alexander and Nikolai work as programmer and designer at ABBYY and Yandex".

In step 803, the extracted facts are compared with the templates.

For this, in order to perform the synthesis of homogeneous facts, after obtaining templates for all the objects (facts) it is necessary to group them (805) so that identical facts and identical templates are in the same group. In stage 805, the facts are grouped by templates.

Next (807), a processing of the group of facts is performed, as illustrated in FIG. 6. During the synthesis the entire group of objects (fact) is considered 600. If the string values of the properties are identical for different objects (that is, the parsing subtrees will be identical), then only one property will end up in the synthesis tree, but if the string values of the properties are different for the different objects, then all of the properties will end up in the synthesis tree, and a coordinating link will be formed between them. An example of a synthesized sentence based on homogeneous facts is: "Alexander and Nikolai work as programmers at ABBYY". In the synthesized sentence, a coordinating link (the conjunction "and") has been placed between "Alexander" and "Nikolai".

After performing these modifications of the algorithm, the synthesis takes place with combining of the homogeneous facts.

Consider the example of the synthesis of homogeneous facts. Make a semantic-syntactic analysis of the following sentences: "Nikolai works as a designer at ABBYY. Vasily has found a job at ABBYY in the position of designer". In each of the sentences, the facts may be identified using the information extraction module. For each of the facts a template may be found, and on this basis of the template a synthesis template may be constructed.

The synthesis module will put out this kind of sentence as its response: "Nikolai and Vasily are designers at ABBYY".

As can be seen from the example above two facts were combined in a single synthesis sentence, even though there are two distinguishing properties, namely, the property "employer" and "employee".

Figure 9:
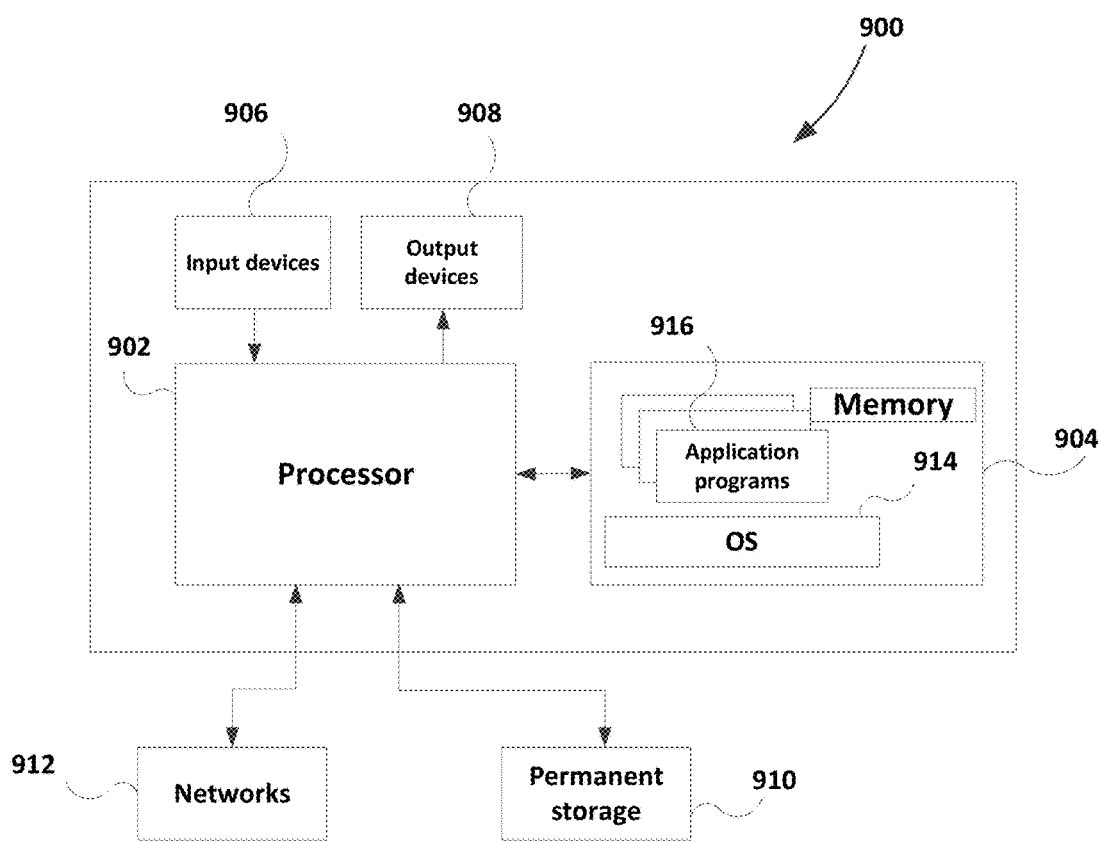
FIG. 9 illustrates an example of a hardware layout which may be used in accordance with an example aspect.

FIG. 9 shows a diagram of hardware (900) which may be used to implement the present disclosure. The hardware (900) should include at least one processor (902) connected to a memory (904). The term "processor" in the diagram (902) may denote one or more processors with one or more computing kernels, a computing device, or any other CPU on the market. The symbol 904 denotes a working storage (RAM), which is the main storage (900), and also additional memory levels—cache, power-independent, backup memory (such as programmable or flash memory), ROM, and so on. Furthermore, the term memory (904) may also mean a storage residing in another part of the system (such as the cache of the processor (902) or another storage used as virtual memory, such as an internal or external ROM (910).

The hardware (900) may have a certain number of inputs and outputs for transmittal and receiving of information. The user or operator interface of the software (900) may be one or more user entry devices (906), such as keyboard, mouse, imaging device, etc., and also one or more output devices (liquid crystal or other display (908)) and sound reproduction (dynamics) devices.

To obtain an additional volume for data storage, data collectors (910) such as diskettes or other removable disks, hard disks, direct access storage devices (DASD), optical drives (compact disks etc.), DVD drives, magnetic tape storages, and so on may be used. The hardware (900) may also include a network connection interface (912)—LAN, WAN, Wi-Fi, Internet and others—for communicating with other computers located in the network. In particular, one may use a local-area network (LAN) or wireless Wi-Fi network, not connected to the worldwide web of the Internet. The hardware (900) may also include analog and digital interfaces for connection of the processor (902) and other components of the system (904, 906, 908, 910 and 912).

The hardware (900) runs under the control of an Operating System (OS) (914), which launches the various applications, components, programs, objects, modules, etc., to carry out aspects of the present disclosure. The application software may include an application to identify semantic ambiguity of language, a client dictionary, an application for automated translation, and other installed applications for imaging of text and graphic content (text processor etc.). In addition, the applications, components, programs and other objects, collectively denoted by the symbol 916 in FIG. 13, may also be launched on the processors of other computers connected to the hardware (900) by a network (912). In particular, the tasks and functions of the computer program may be distributed between computers in a distributed computing environment.

All the routine operations in the use of the implementations may be executed by the operating system or separate applications, components, programs, objects, modules or sequential instructions, generically termed "computer programs". The computer programs usually constitute a series of instructions executed at different times by different data storage and memory devices on the computer. After reading and executing the instructions, the processors perform the operations needed to initialize the elements of the described implementation. Several variants of implementations have been described in the context of fully functioning computers and computer systems. The specialists in the field will properly judge the possibilities of disseminating certain modifications in the form of various program products on any given types of information media. Examples of such media are power-dependent and power-independent memory devices, such as diskettes and other removable disks, hard disks, optical disks (such as CD-ROM, DVD, flash disks) and so forth. Such a program package may be downloaded via the Internet.

In the present disclosure, specific details have been presented solely for explanation, and structures and devices have been shown in the form of block diagrams for greater clarity.

The references in this specification to "one variant implementation/realization" or "variant implementation/realization" mean that the specific feature, structure or characteristic described for the variant realization is a component of at least one variant realization. The use of the phrase "in one variant realization" in different parts of the specification does not mean that the specifications pertain to the identical variant realization or that these specifications pertain to different or alternative, mutually exclusive variants of realization. Furthermore, different specifications of characteristics may pertain to certain variants of realization, but not pertain to other variants of realization. Different specifications of requirements may pertain to certain variants of realization and not pertain to other variants of realization.

Certain specimens of variants of realization have been specified and shown in the appended drawings. However, it should be understood that such variants of realization are simply examples, but not limitations of the specified variants of realization, and that these variants of realization are not limited to the specific indicated and described designs and devices, since specialists in this field of technology on the basis of the presented materials may create their own variants of realization. In the field of technology to which the present disclosure pertains, it is difficult to foresee the rapid development and further accomplishments, and so the specified variants of realization may easily be replaced in the device and its parts thanks to the development of technology, while maintaining the principles of the present specified disclosure.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium may comprise RAM, ROM, EEPROM, CD-ROM, Flash memory or other types of electric, magnetic, or optical storage medium, or any other medium that may be used to carry or store desired program code in the form of instructions or data structures and that may be accessed by a processor of a general purpose computer.

In the interest of clarity, not all of the routine features of the aspects are explicitly disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the concepts disclosed herein.

What is claimed is:

1. A method comprising:
receiving, by a hardware processor, a plurality of information objects extracted from text data in one or more source text documents, the plurality of information objects having representations in a data model, wherein each information object comprises one or more properties and, for each property, a corresponding natural language string value from the text data;
selecting, by the hardware processor, at least one information object and a synthesis template associated with the selected information object, wherein the selecting of the at least one information object and the synthesis template associated with the selected information object comprises:
selecting the at least one information object from the plurality of information objects; and
selecting the synthesis template associated with the selected information object from a plurality of synthesis templates stored in a template library, the synthesis template comprising a sentence in a natural language, a plurality of substitutions comprising one or more words from the sentence and their associated properties, and a template semantic-syntactic tree, and wherein the template semantic-syntactic tree is generated based on the sentence in the natural language, wherein the selecting of the synthesis template associated with the selected information object comprises:
for each synthesis template from the plurality of synthesis templates:
comparing a property associated with a word in a plurality of substitutions of a respective synthesis template with one or more properties of the selected information object;
responsive to determining that the property of the respective synthesis template matches one of the one or more properties of the selected information object, determining whether a natural language string value corresponding to the matching property of the selected information object is nominative or not; and
responsive to determining that the natural language string value is not nominative, eliminating the respective synthesis template from the plurality of synthesis templates for selection;
generating, by the hardware processor, for each selected information object, a synthesis semantic-syntactic tree based on the template semantic-syntactic tree and the plurality of substitutions of the synthesis template associated with the selected information object; and
generating, by the hardware processor, a natural language text based on each generated synthesis semantic-syntactic tree to provide an annotation for the text data in the one or more source text documents.

2. The method of claim 1, wherein generating for the selected information object a synthesis semantic-syntactic tree further comprises:
responsive to determining that the template node is in the substitutions of the associated synthesis template and the associated property of the template node is a filled property of the selected information object, and the filled property of the selected information object has more than one natural-language string value,
for each natural-language string value, generating in the synthesis semantic-syntactic tree a node or a sub-tree based on a semantic-syntactic analysis of the natural-language string value of the filled property; and
connecting the generated nodes with a coordinating link.

3. The method of claim 1, further comprising:
forming at least one group of selected information objects associated with the same synthesis template; and
generating for the at least one group the synthesis semantic-syntactic tree based on the template semantic-syntactic tree of the associated synthesis template.

4. A system comprising:
a memory; and
a hardware processor, coupled to the memory, to:
receive a plurality of information objects extracted from text data in one or more source text documents, the plurality of information objects having representations in a data model, wherein each information object comprises one or more properties and, for each property, a corresponding natural language string value from the text data;
select at least one information object and a synthesis template associated with the selected information object, wherein to select the at least one information object and the synthesis template associated with the selected information object, the hardware processor further to:
select the at least one information object from the plurality of information objects; and
select the synthesis template from a plurality of synthesis templates stored in a template library, the synthesis template comprising a sentence in a natural language, a plurality of substitutions parameters comprising one or more words from the sentence and their associated properties, and a template semantic-syntactic tree, and wherein the template semantic-syntactic tree is generated based on the sentence in the natural language wherein to select the synthesis template associated with the selected information object, the hardware processor further to:
for each synthesis template from the plurality of synthesis templates:
compare a property associated with a word in a plurality of substitutions of a respective synthesis template with one or more properties of the selected information object;
responsive to determining that the property of the respective synthesis template matches one of the one or more properties of the selected information object, determine whether a natural language string value corresponding to the matching property of the selected information object is nominative or not; and
responsive to determining that the natural language string value is not nominative, eliminate the respective synthesis template from the plurality of synthesis templates for selection;

generate for each selected information object a synthesis semantic-syntactic tree based on the template semantic-syntactic tree and the plurality of substitutions of the synthesis template associated with the selected information object; and
generate a natural language text based on each generated synthesis semantic-syntactic tree to provide an annotation for the text data in the one or more source text documents.

5. The system of claim 4, is further to:
form at least one group of selected information objects associated with the same synthesis template; and
generate for the at least one group the synthesis semantic-syntactic tree based on the template semantic-syntactic tree of the associated synthesis template.

6. A computer program product stored on a non-transitory computer-readable storage medium, the computer program product comprising computer-executable instructions for synthesis of natural-language text, comprising instructions for:
receiving, by a hardware processor, a plurality of information objects extracted from text data in one or more source text documents, the plurality of information objects having representations in a data model, wherein each information object comprises one or more properties and, for each property, a corresponding natural language string value from the text data;
selecting, by the hardware processor, at least one information object and a synthesis template associated with the selected information object, wherein the selecting of the at least one information object and the synthesis template associated with the selected information object comprises:
selecting the at least one information object from the plurality of information objects; and
selecting the synthesis template from a plurality of synthesis templates stored in a template library, the synthesis template comprises a sentence in a natural language, a plurality of substitutions comprising one or more words from the sentence and their associated properties, and a template semantic-syntactic tree, and wherein the template semantic-syntactic tree is generated based on the sentence in the natural language, wherein the selecting of the synthesis template associated with the selected information object comprises:
for each synthesis template from the plurality of synthesis templates:
comparing a property associated with a word in a plurality of substitutions of a respective synthesis template with one or more properties of the selected information object;
responsive to determining that the property of the respective synthesis template matches one of the one or more properties of the selected information object, determining whether a natural language string value corresponding to the matching property of the selected information object is nominative or not; and
responsive to determining that the natural language string value is not nominative, eliminating the respective synthesis template from the plurality of synthesis templates for selection;
generating, by the hardware processor, for the selected information object, a synthesis semantic-syntactic tree based on the template semantic-syntactic tree and the plurality of substitutions of the synthesis template associated with the selected information object;

generating by the hardware processor, natural language text based on each generated synthesis semantic-syntactic tree to provide an annotation for the text data in the one or more source text documents.

7. The computer program product of claim 6, further comprising instructions for:
forming at least one group of selected information objects associated with the same synthesis template; and
generating for the at least one group a synthesis semantic-syntactic tree based on the template semantic-syntactic tree of the associated synthesis template.

8. The method of claim 1, wherein the information object is associated with an ontological object and has a set of filled properties, a filled property having a value.

9. The method of claim 1, wherein the synthesis template is associated with an ontological object.

10. The method of claim 1, wherein the synthesis template comprises a set of required properties.

11. The method of claim 1, wherein the synthesis template comprises a set of optional properties.

12. The method of claim 1, wherein the synthesis template comprises a validation script.

13. The method of claim 1, wherein selecting the at least one information object and the synthesis template associated with the selected information object from a plurality of synthesis templates comprises:
for an information object of the plurality of information objects, determining whether there is a set of synthesis templates from the plurality of synthesis templates associated with the same ontological object as the information object;
responsive to determining that there is a set of synthesis templates associated with the same ontological object as the information object, determining whether the set of synthesis templates includes a first remaining set of synthesis templates that each have a set of required properties matching a set of filled properties of the information object;
responsive to determining that the set of synthesis templates includes the first remaining set of synthesis templates that each have the set of required properties matching the set of filled properties of the information object, determining whether the first remaining set includes a second remaining set of synthesis templates with the largest set of required properties, wherein the first remaining set comprises the second remaining set;
responsive to determining that the first remaining set includes the second remaining set of synthesis templates with the largest set of required properties, determining whether a third remaining set includes a fourth remaining set of synthesis templates with the largest intersection of the set of optional properties with the set of filled properties of the information object; and
responsive to determining that the third remaining set includes the fourth remaining set of synthesis templates with the largest intersection of the set of optional properties with the set of filled properties of the information object, adding the information object to the at least one selected information object and associating a synthesis template from the fourth remaining set of synthesis templates with the added information object.

14. The method of claim 1, wherein the selected information object has a set of filled properties, a filled property having a natural-language string value.

15. The method of claim 1, wherein the template semantic-syntactic tree comprises template nodes representing words of the template sentence in the natural language and edges representing relations between the words.

16. The method of claim 1, wherein the template sentence and the plurality of substitutions are identified by a user.

17. The method of claim 1, wherein the plurality of substitutions forming a substitution list.

18. The method of claim 1, wherein the template semantic-syntactic tree comprises for each of one or more template nodes an associated property from the plurality of substitution parameters.

19. The method of claim 1, wherein generating for the selected information object a synthesis semantic-syntactic tree comprising a root node and one or more leaf nodes comprises traversing the template semantic-syntactic tree from the root node to the leaf nodes.

20. The method of claim 1, wherein generating for the selected information object a synthesis semantic-syntactic tree comprises:
for a template node of the template semantic-syntactic tree,
generating an identical node in the synthesis semantic-syntactic tree, responsive to determining the template node is not in the plurality of substitution parameters of the synthesis template;
generating a node or a sub-tree in the synthesis semantic-syntactic tree based on a semantic-syntactic analysis of the natural-language string value of the filled property, responsive to determining the template node is in the plurality of substitution parameters of the synthesis template and the associated property of the template node is a filled property of the selected information object; and
refraining from generating a node in the synthesis semantic-syntactic tree, responsive to determining the template node is in the plurality of substitution parameters of synthesis template and the associated property of the template node is not a filled property of the information object.

* * * * *